United States Patent
Kato et al.

[11] Patent Number: 6,108,976
[45] Date of Patent: Aug. 29, 2000

[54] FEEDER ARRANGEMENT OF SLIDING DOOR

[75] Inventors: Yukiyasu Kato, Iwato-gun; Kiyoshi Tamada, Kosai; Hiroyuki Harada, Hamamatsu, all of Japan

[73] Assignee: Amso., Co, Ltd., Shizuoka. Pref., Japan

[21] Appl. No.: 09/054,310

[22] Filed: Apr. 2, 1998

[30] Foreign Application Priority Data

| Apr. 2, 1997 | [JP] | Japan | 9-084150 |
| Jun. 27, 1997 | [JP] | Japan | 9-172534 |
| Jun. 27, 1997 | [JP] | Japan | 9-172535 |
| Dec. 3, 1997 | [JP] | Japan | 9-332601 |
| Dec. 3, 1997 | [JP] | Japan | 9-332602 |
| Dec. 3, 1997 | [JP] | Japan | 9-350067 |

[51] Int. Cl.$^7$ .................................................. E05F 11/00
[52] U.S. Cl. ........................................ 49/360; 49/352
[58] Field of Search ........................ 49/139, 360, 361, 49/352; 242/378, 388; 191/12-2 R

[56] References Cited

U.S. PATENT DOCUMENTS

| 1,947,392 | 2/1934 | Guntermann et al. | 191/12.2 R |
| 4,490,624 | 12/1984 | Luker | 307/66 |
| 4,640,050 | 2/1987 | Yamagishi et al. | 49/360 |
| 4,713,497 | 12/1987 | Smith | 191/12.2 R |
| 4,887,390 | 12/1989 | Boyko et al. | 49/214 |
| 4,940,859 | 7/1990 | Peterson et al. | 191/12.2 R |
| 5,144,769 | 9/1992 | Koura | 49/360 |
| 5,155,937 | 10/1992 | Yamagishi et al. | 49/360 |
| 5,168,666 | 12/1992 | Koura | 49/360 |
| 5,319,880 | 6/1994 | Kuhlman | 49/360 |
| 5,453,585 | 9/1995 | Lenz et al. | 191/12.2 R |
| 5,551,190 | 9/1996 | Yamagishi et al. | 49/360 |
| 5,657,940 | 8/1997 | Ishikawa et al. | 242/388 |
| 5,737,875 | 4/1998 | Dowling et al. | 49/360 |
| 5,806,246 | 9/1998 | Azuma | 49/360 |
| 5,813,282 | 9/1998 | Azuma | 49/360 |
| 5,832,669 | 11/1998 | Mizuki et al. | 49/360 |
| 5,884,433 | 3/1999 | Watanabe et al. | 49/360 |

FOREIGN PATENT DOCUMENTS

| 4-20688 | 5/1992 | Japan . |
| 5-12225 | 2/1993 | Japan . |
| 5-179861 | 7/1993 | Japan . |
| 6-995 | 1/1994 | Japan . |
| 7-267020 | 3/1994 | Japan . |
| 6-297950 | 10/1994 | Japan . |
| 8-232539 | 9/1996 | Japan . |
| 9-56492 | 3/1998 | Japan . |

*Primary Examiner*—Daniel P. Stodola
*Assistant Examiner*—Curtis A. Cohen
*Attorney, Agent, or Firm*—Fish & Richardson P.C.

[57] ABSTRACT

A feeder arrangement supplying power from a battery to an on-door electric device disposed in a sliding door includes a flexible cable for supplying electric power to the on-door electric device and a spool unit for winding and unwinding the flexible cable. The feeder arrangement includes an actuator for driving the sliding door in synchronism with the spool unit, a driving tape linking the actuator and the sliding door.

23 Claims, 21 Drawing Sheets

OPEN ←——→ CLOSE

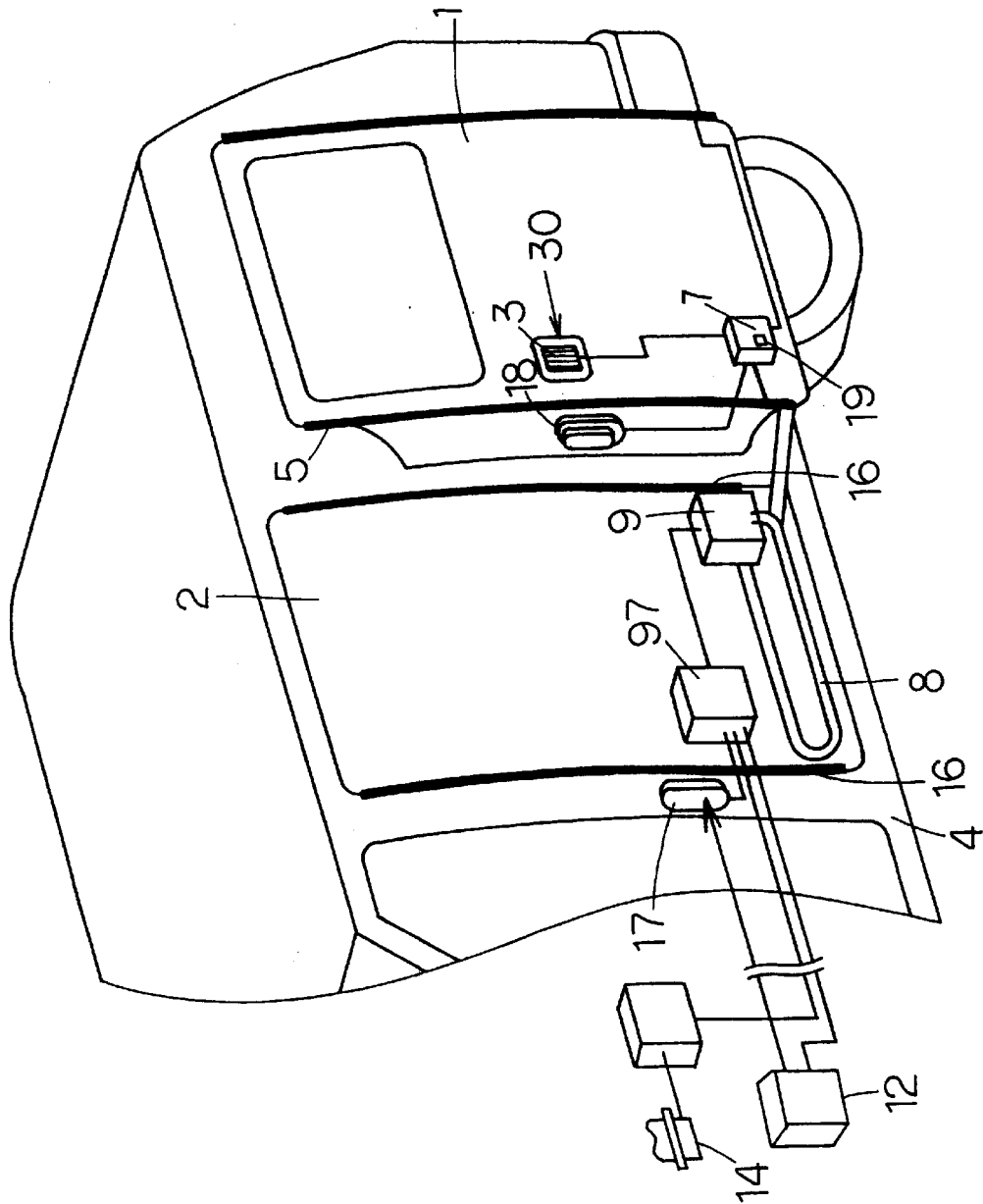

(A—A)

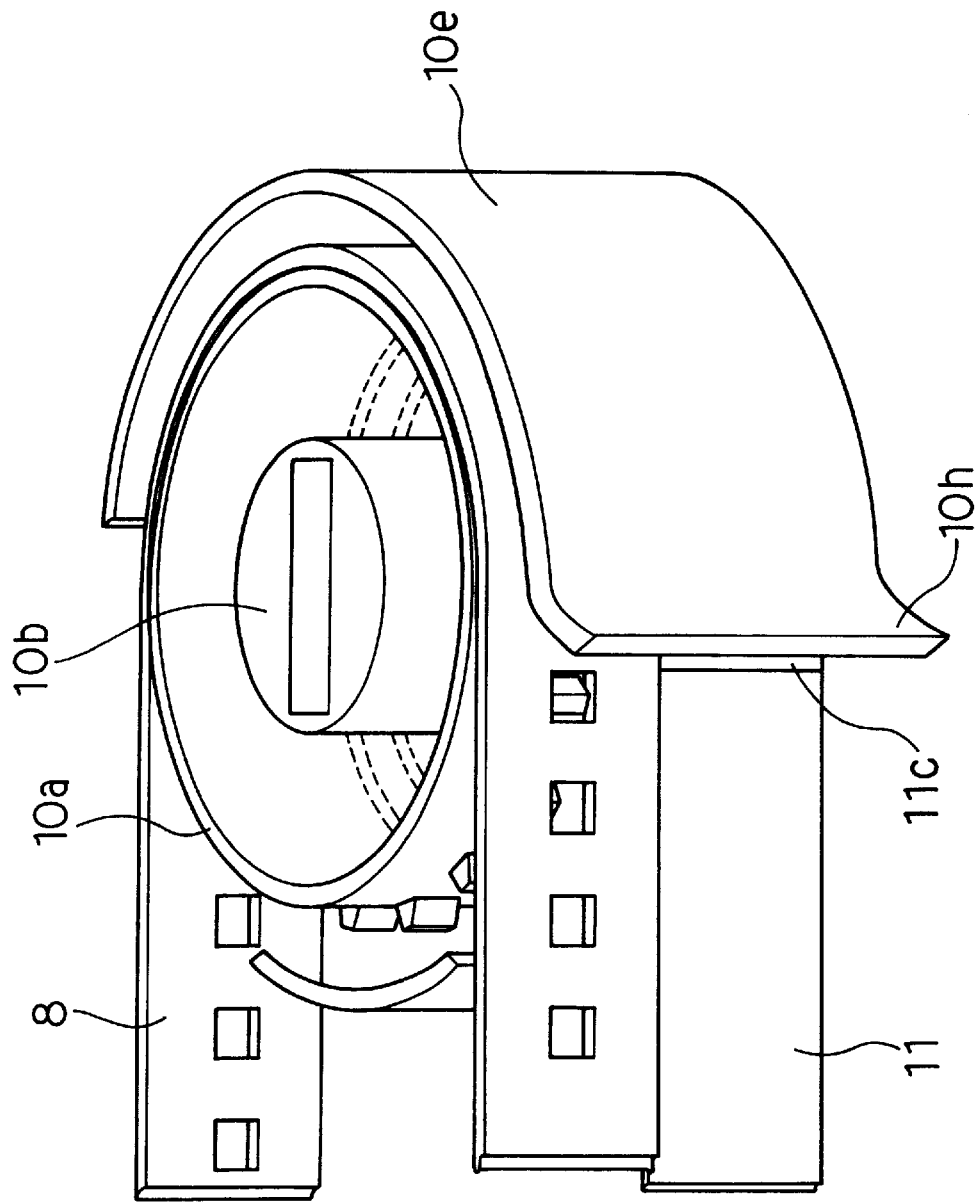

FEEDER ARRANGEMENT OF SLIDING DOOR

CROSS REFERENCE TO RELATED APPLICATION

The present application is based on and claims priority from Japanese Patent Applications 9-84150 filed on Apr. 2, 1997, 9-172534 filed on Jun. 27, 1997, 9-172535 filed on Jun. 27, 1997, 9-332601 filed on Dec. 3, 1997, 9-332602 filed on Dec. 3, 1997 and 9-350067 filed on Dec. 3, 1997, the contents of which are incorporated herein by reference.

BACKGROUND OF THE INVENTION

1. Field of the Invention

The present invention relates to a feeder arrangement for feeding electric power to devices disposed in a sliding door of a vehicle.

2. Description of the Related Art

JP-A-7-267020 discloses a feeder arrangement composed of a female connector disposed in a vehicle body and a male connector disposed in a sliding door. When the sliding door is closed, both connectors contact with each other to supply electric power to electric devices disposed in the sliding door. Therefore, the electric power can not be supplied while the door is opened. For example, if the sliding door is equipped with a power window, the window can not be operated while the sliding door is opened.

SUMMARY OF THE INVENTION

Therefore, a main object of the present invention is to provide an improved feeder arrangement of the sliding door which can supply devices disposed in the sliding door whether the sliding door is opened or not.

According to a main aspect of the present invention, a feeder arrangement for supplying power from a battery to an on-door electric device disposed in a sliding door includes a flexible cable for supplying electric power to the on-door electric device and a spool unit for winding and unwinding the flexible cable in synchronism with motion of the sliding door. The above feeder arrangement may include an actuator for driving the sliding door in synchronism with the spool, a driving tape linking the actuator and the sliding door.

According to another aspect of the present invention, a feeder arrangement for supplying power from a battery to an on-door electric device disposed in a sliding door includes a couple of connector members first member of which is disposed in the sliding door and the second member of which is connected to the battery and disposed at a portion outside the sliding door to be coupled when the sliding door is closed and a rechargeable on-door battery connected to the first member for supplying the on-door electric device with electric power when the sliding door is not closed.

According to another aspect of the present invention, a feeder arrangement for supplying power from a battery to an on-door electric device disposed in a sliding door includes a sensor disposed in the sliding door for detecting manual operation of the sliding door, a retractable flexible cable for electrically connecting the battery and the on-door electric device and an actuator for driving the sliding door when the sensor detects the manual operation. The spool of this feeder arrangement may include a rotary drum rotatable to wind and unwind the flexible cable in synchronism with motion of the sliding door, stationary drum and retractable adjusting cable disposed between the rotary drum and the stationary drum for electrically connecting the battery and the flexible cable.

According to another aspect of the present invention, a feeder arrangement for supplying power from a main battery to an on-door electric device disposed in a sliding door includes a rechargeable on-door battery disposed in the sliding door, an on-door battery-charging unit connected to the on-door battery and a connecting unit for connecting the main battery and the on-door battery-charging unit when the sliding door is closed.

According to another aspect of the present invention, a feeder arrangement for supplying power from a battery to an on-door electric device disposed in a sliding door including first means for driving the sliding door, second means for providing a signal controlling the actuator, a flexible cable electrically connected to the battery and the on-door electric device, a spool unit for winding and unwinding the flexible cable in synchronism with motion of the sliding door, and third means for transmitting the signal to the actuator.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 7 is a schematic diagram illustrating a feeder arrangement according to a second embodiment of the present invention;

FIG. 21 is a schematic diagram illustrating a spool of a feeder arrangement according to a variant of the sixth embodiment of the present invention;

DETAILED DESCRIPTION OF THE PREFERRED EMBODIMENTS

First Embodiment

A feeder arrangement according to a first embodiment of the present invention is described with reference to FIGS. 1–4, FIG. 5A–5C and FIG. 6.

Figure 1:
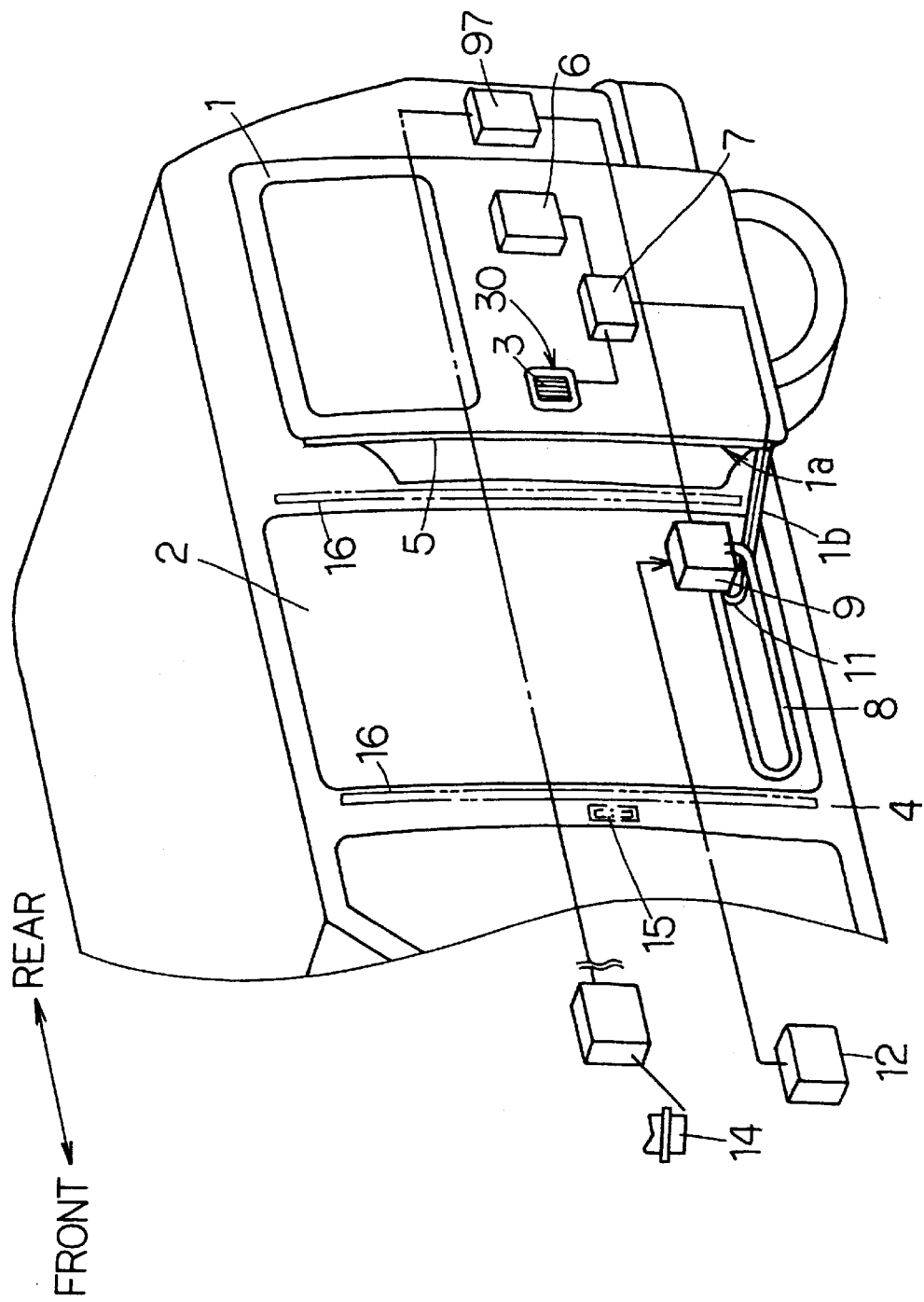
FIG. 1 is a schematic diagram illustrating a feeder arrangement according to a first embodiment of the present invention.

In FIG. 1, sliding door 1 is provided with pressure sensor 3 disposed at door handle 30 and a pressure-sensing switch 5 disposed at portion 1a of sliding door 1 which is adjacent to body 4 when sliding door 1 is closed, door lock unit 6 and on-door controller 7 mounted on sliding door 1.

When a driver or passenger operates door handle 30 to open or close sliding door 1, pressure sensor 3 detects the pressure applied to door handle 30. Pressure-sensing switch 5 is composed of a pair of parallelly extending electrodes and an elastic tube such as a rubber tube enclosing the electrodes. Pressure-sensing switch 5 provides a signal when pressure is applied to the tube from outside to bring the electrodes into contact with each other. The signal of pressure-sensing switch 5 is sent to sliding-door controller 97 through on-door controller 7.

Figure 2:
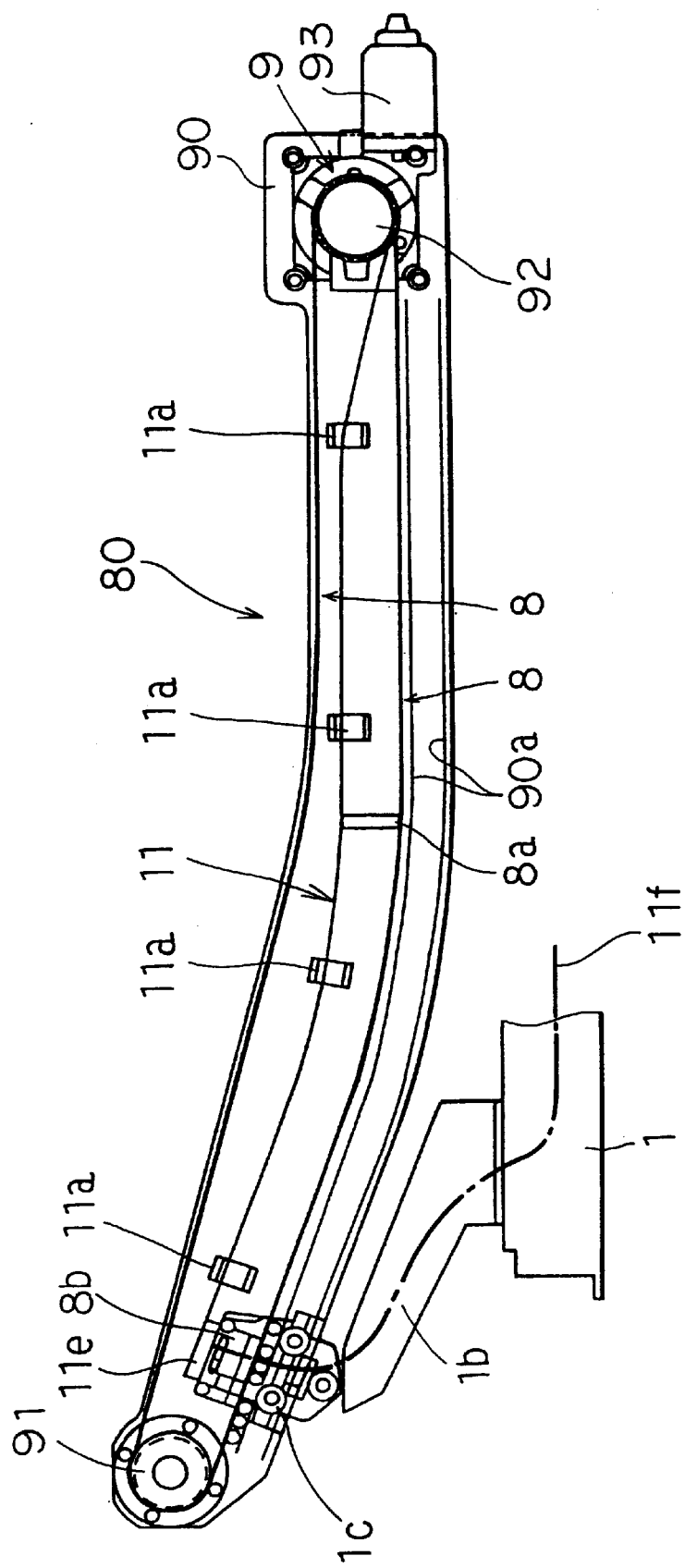
FIG. 2 is a schematic diagram illustrating a sliding-door drive unit of the feeder arrangement according to the first embodiment.

FIG. 2 illustrates sliding-door-drive unit 80. Sliding-door-drive unit 80 is composed of base plate 90 fixed to vehicle body 4, pulley 91 disposed at a front portion of entrance 2, actuator 9 fixed to base plate 90 to be disposed at a floor on the rear side of entrance 2, tension control unit 8b and roller 1c. Tension control unit 8b is fixed to roller 1c.

Figure 3:
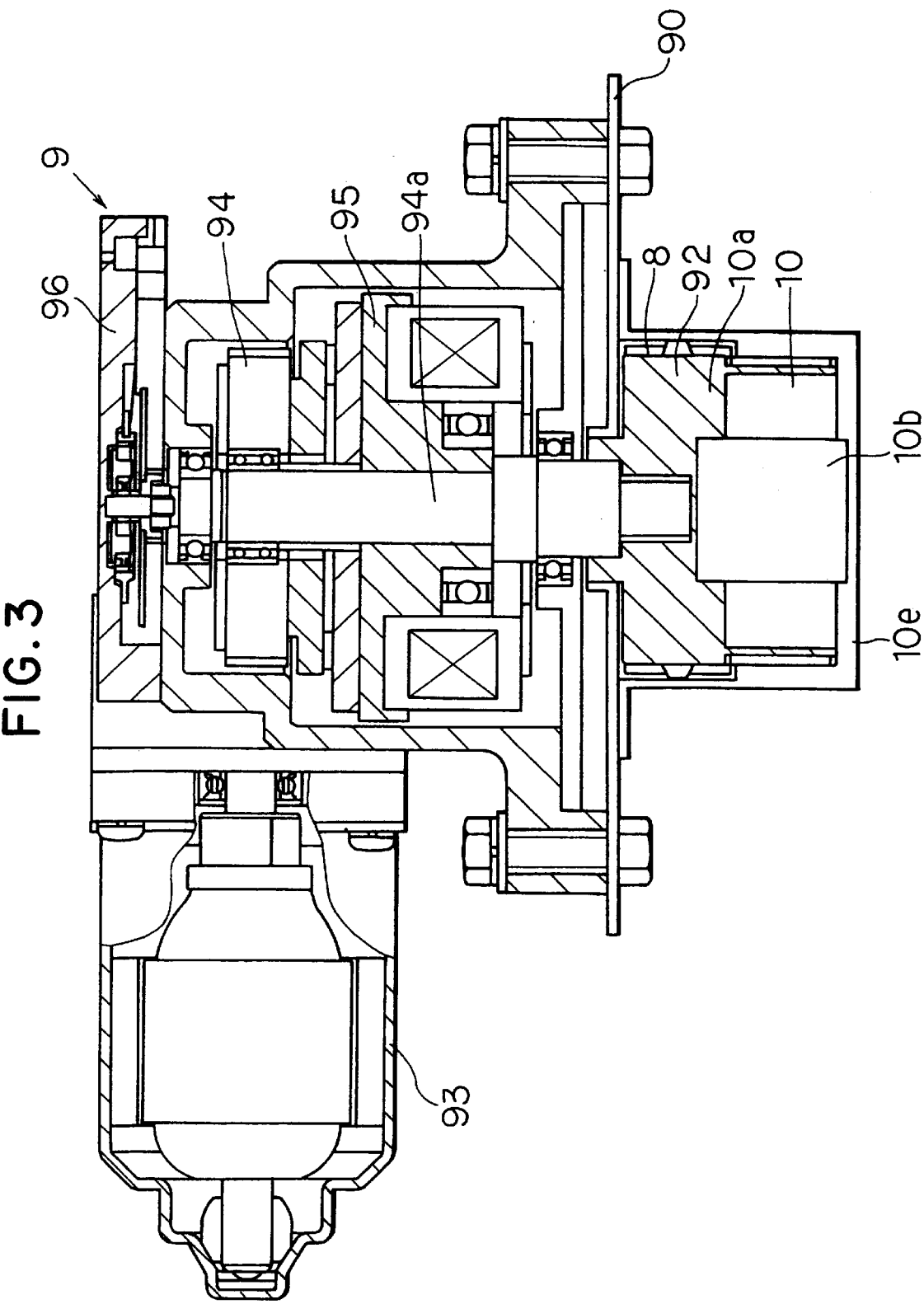
FIG. 3 is a cross-sectional side view of an actuator of the feeder arrangement according to the first embodiment.
Figure 4:
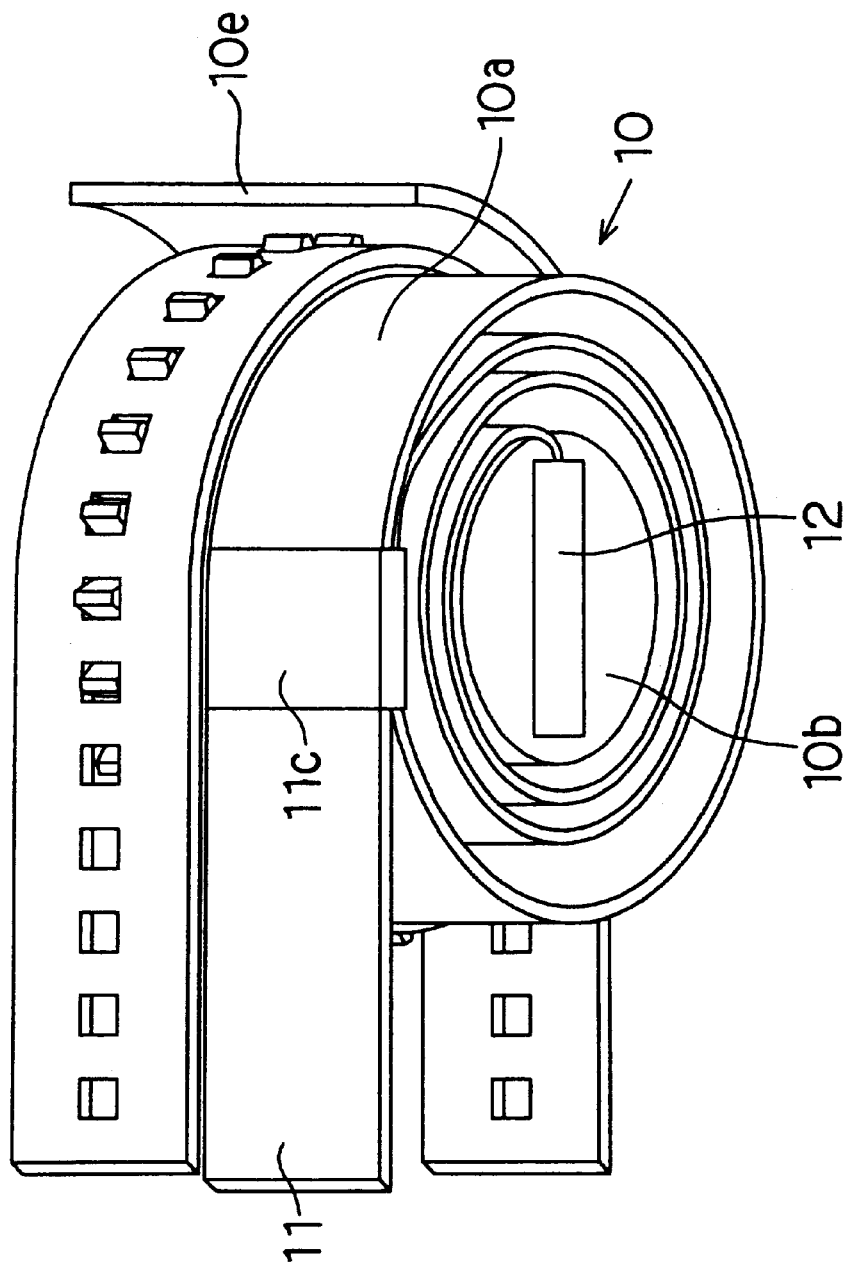
FIG. 4 is a fragmental perspective view of a spool and sprocket of the feeder arrangement according to the first embodiment.

Door stay 1b is fixed to the lower side of sliding door 1, and roller 1c is fixed to door stay 1b to move along guide rails 90a formed on base plate 90, thereby moving sliding door 1 back and forth. Tape 8 has a train of holes and connects pulley 91 and sprocket (or toothed wheel) 92 of actuator 9. Tension control unit 8b connects opposite ends of driving tape 8 to form a ring and moves together with driving tape 8. Teeth of sprocket 92 engages the holes in a well-known manner. When sliding door 1 is manually opened, roller 1c moves rearward (to the right in FIG. 2) along guide rails 90a, and tape 8 and sprocket 92 rotate counterclockwise. On the other hand, when sliding door 1 is manually closed, roller 1c moves rearward along guide rails 90a to rotate tape 8 and sprocket clockwise. As shown in FIG. 3, actuator 9 is composed of motor 93, speed reduction unit 94 having a warm and a warm wheel, electromagnetic clutch 95 disposed between speed reduction unit 94 and sprocket 92 and rotation sensor 96 for detecting rotation of sprocket 92. Speed reduction unit 94 has also output shaft 94a which is connected to sprocket 92. When electro magnetic clutch 95 is energized, it connects sprocket 92 and speed reduction unit 94. Rotation sensor 96 is disposed to be coaxial with sprocket 92 and is electrically connected to sliding door controller 97. Rotation sensor 96 generates pulse signals in synchronism with the rotation of sprocket 92 and sends the pulse signals to sliding door controller 97. Reference numeral 10 is a spool for winding flexible cable 11 which is conductive and is connected to battery 12. Spool 10 is integrated with sprocket 92 to be rotated in a unit by motor 93 via clutch 95. Electric power is supplied through cable 11 to pressure sensor 3, door lock unit 6 and on-door controller 7. Spool 10 is rotated by motor 93 via electromagnetic clutch 95 along with sprocket 92. Spool 10 is composed of cylindrical rotary drum 10a, stationary drum 10b and protecting cover 10e as shown in FIG. 4. Rotary drum 10a has the same outside diameter as sprocket 92. Thus, as tape 8 moves, cable 11 is drawn by the same length as tape 8. One end of cable 11 is secured to rotary drum 10a by resinous member 11c with a lead wire (not shown) connecting the same to controller 97. Reference numeral 8a and 11a indicate guide members for tape 8 and for cable 11 respectively. The other end of cable 11 has connector 11e which is fixed to tension control unit 8b. Cable 11 is connected to on-door controller 7 through connector 11e and lead wire 11f which extends along door stay 1b into sliding door 1.

Sliding door controller 97 controls actuator 9. For this purpose, signals are applied to controller from pressure sensor 3, rotation sensor 96, door switch 14 for the driver's seat and entrance switch 15 disposed near entrance 2 for manually operating actuator 9. Tape 8, actuator 9, pulley 91, sliding door controller 97, switches 14, 15 and pressure sensor 3 compose a door control unit. A pair of pressure sensing switches 16, which have the same structure as pressure sensing switch 5, is disposed opposite sides of entrance 2 and connected to sliding door controller 97 for sending output signals thereof.

When signals are sent to sliding door controller 97 from driver's door switch 14 and entrance switch 15, or when a signal is sent to the same from pressure sensor 3 which detects an operation force higher than a reference value, sliding door controller 97 controls actuator 9 to open or close sliding door 1. When switches 14, 15 are operated to open sliding door 1 while the same is being closed, sliding door controller 97 stops motor 93. When switches 14, 15 are operated again thereafter, sliding door controller 97 starts motor 93 according to the signals.

Figure 6:
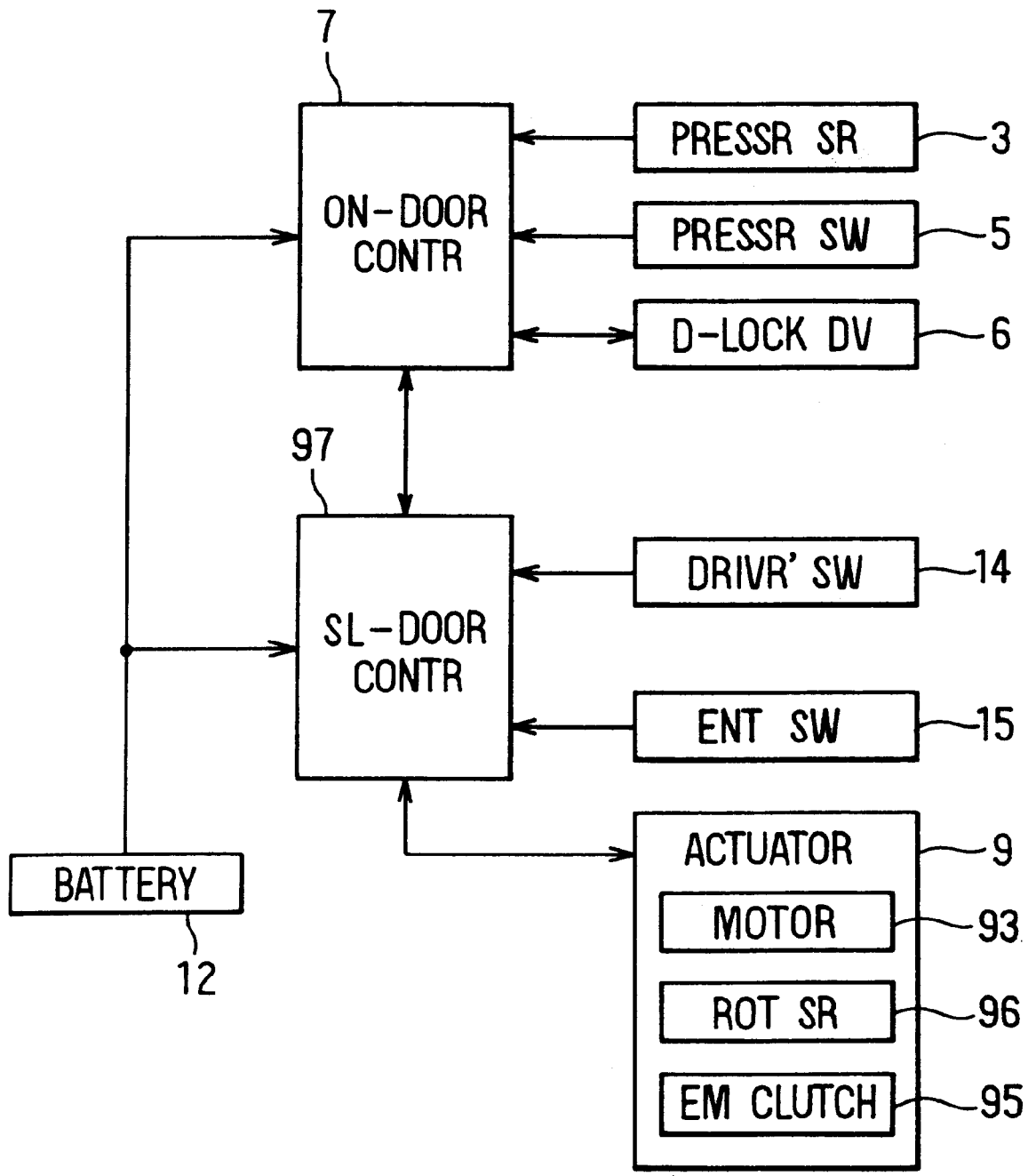
FIG. 6 is a block diagram of the control system of the feeder arrangement according to the first embodiment.

The operation of sliding door 1 is described with reference to FIG. 6.

Sliding door controller 97 counts the number of pulse signals sent from rotation sensor 96 and detects the position of sliding door. Rotation sensor 96 detects the position whether sliding door is operated automatically or not. Sliding door controller 97 controls door lock unit 6 mounted in sliding door 1 through on-door controller 7. When one of pressure sensing switches 5 and 6 sends a signal while sliding door 1 is being closed, controller 97 decides that something is caught by sliding door 1 and body 4 and reverses motor 93 to open sliding door 1. Whether sliding door 1 is being closed or not is detected by rotation sensor 96. Sliding door controller 97 also controls actuator 9 to open or close sliding door 1 when pressure sensor 3 detects operation of door handle 30 through on-door controller 6. For example, if a passenger operates door handle 30 while sliding door 1 is fully closed, sliding door controller 97 controls actuator 9 to open sliding door 1 according to the signal pressure sensor 3. On the other hand, if door handle 30 is operated while sliding door 1 is fully opened, sliding door controller 97 controls actuator 9 to close sliding door 1. Sliding door controller 97 also opens or closes sliding door 1 according to signals from driver's door switch 14 or entrance switch 15.

Figure 5A:
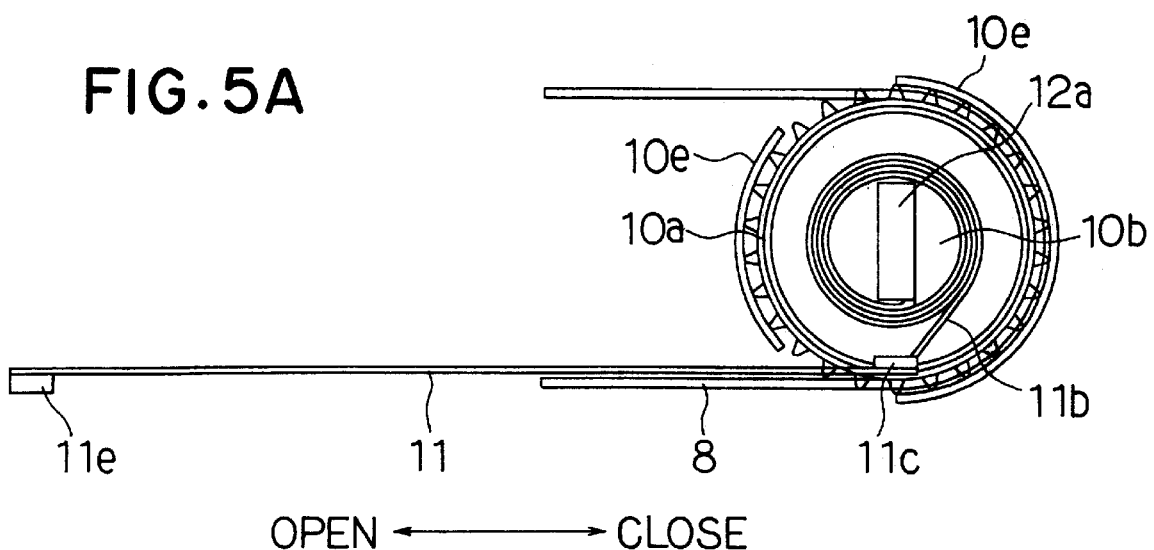
FIGS. 5A, 5B, 5C are schematic diagram illustrating operation of the spool of the feeder arrangement according to the first embodiment.
Figure 5B:
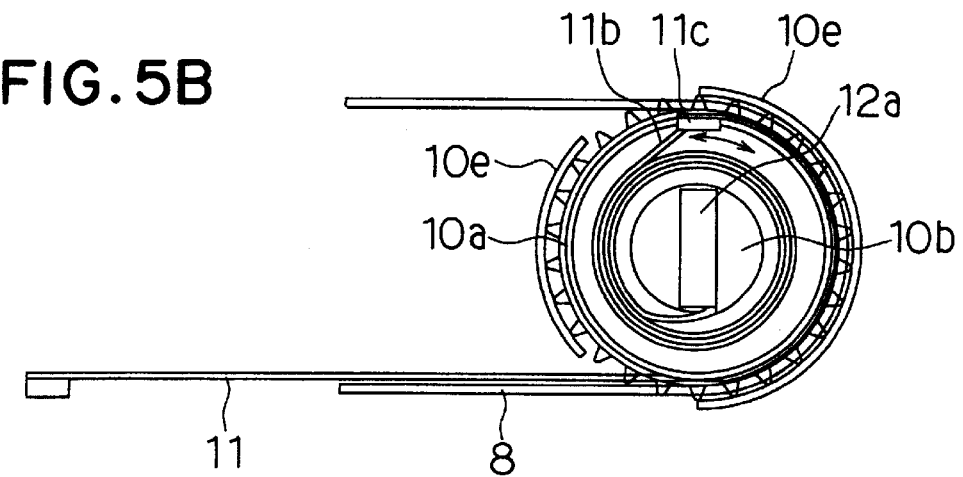
Figure 5C:
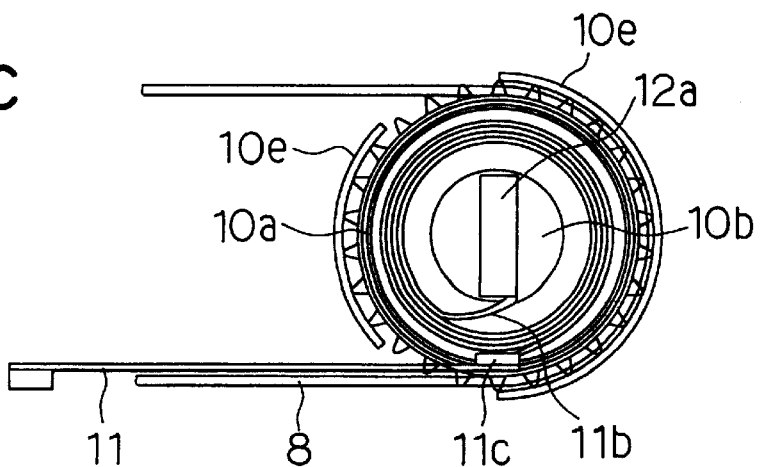

Spool 10 rotates as sliding door 1 moves so that cable 11 may not bend excessively. Adjusting cable 11b is disposed between rotary drum 10a and stationary drum 10b to be wound tightly around stationary drum 10b when sliding door 1 is closed as shown in FIG. 5A. One end of adjusting cable 11b is connected to the one end of cable 11 at resinous member 11c. The other end of adjusting cable 11b is secured to stationary drum 10b and electrically connected to connector 12a which is connected to battery 12. When cable 11 is wound while sliding door is opened, adjusting cable 11b, which has been wound around stationary drum 10b, is gradually loosened. This reduces excessive tension or torsional stress on lead wire 11c.

As sliding door 1 is moved to open or close by tape 8 that is driven by sprocket 92, cable 11 is wound or unwound by spool 10 that is rotated along with sprocket 92. Therefore, no stress is applied to cable 11. Since spool 10 is rotated by motor 93 that moves sliding door 1, no additional driving means is necessary.

Second Embodiment

Figure 8A:
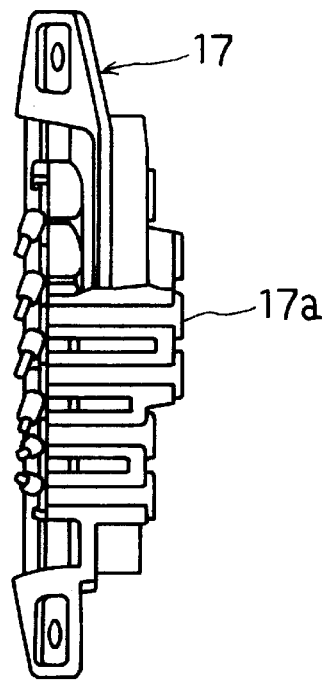
FIGS. 8A, 8B are fragmentary cross-sectional side views illustrating female and male contact members of a feeder contact unit of the feeder arrangement according to the second embodiment.
Figure 8B:
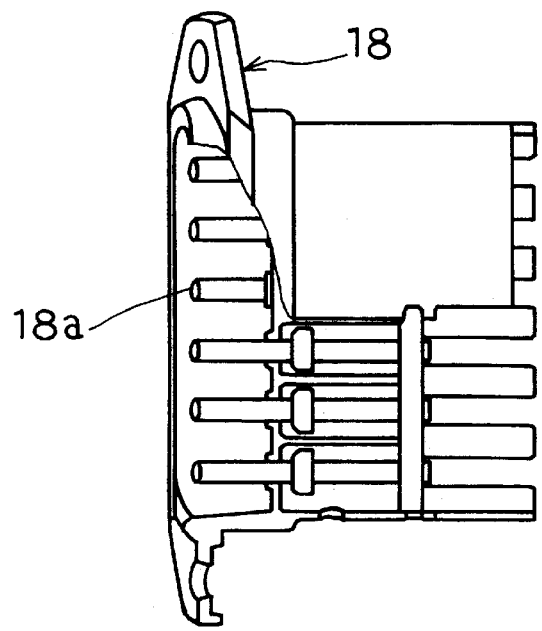

A feeder arrangement according to a second embodiment of the present invention is described with reference to FIG. 7 and FIGS. 8A and 8B.

Instead of the cable described before, feeder contact unit 17 is disposed at a portion of body 4 adjacent to the front side of entrance 2, and on-door contact unit 18 is disposed at a portion of sliding door 1 corresponding to feeder contact unit 17. Feeder contact unit 17 has female connector 17a as shown in FIG. 8A, and on-door contact unit 18 has a male connector as shown in FIG. 8B. On-door controller 7 has rechargeable battery 19 connected to on-door contact unit 18.

Rechargeable battery Bo is charged through on-door contact unit 18 while sliding door 1 is closed and feeder contact unit 17 and on-door contact unit 18 are coupled. On the other hand, rechargeable battery Bo supplies electric power to on-door controller 7 and pressure sensor 3 while sliding door 1 is opened.

Pressure sensor 3 can be replaced with any other member which can detect the operation of door handle 30. For example, it can be replaced with a potentiometer, a touch switch or an element equivalent thereto. Motor 93 can be replaced with a coil spring or the like also.

Third Embodiment

Figure 9:
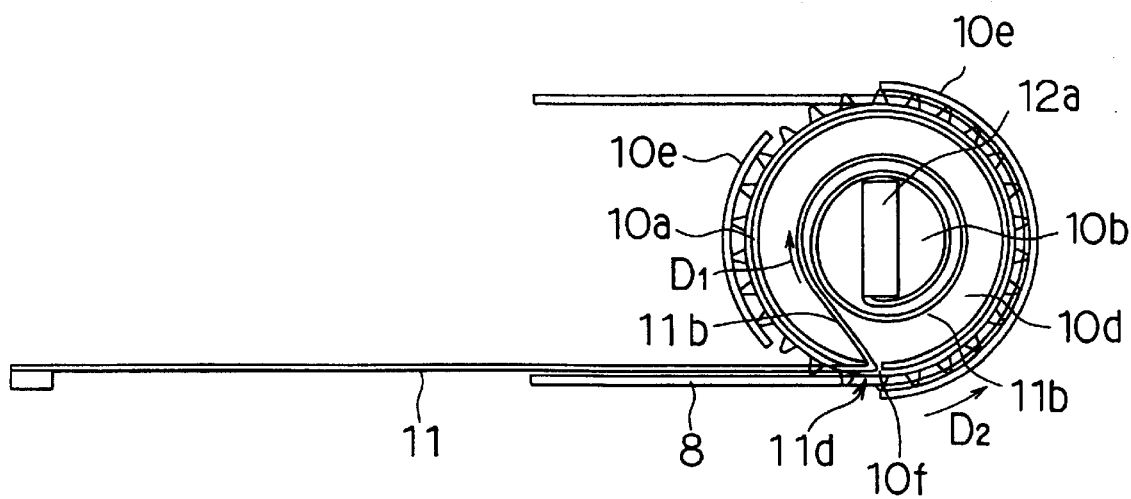
FIG. 9 is a schematic diagram illustrating a spool of a feeder arrangement according to a third embodiment of the present invention.

A feeder arrangement according to a third embodiment of the present invention is described with reference to FIG. 9 and 10.

Figure 10:
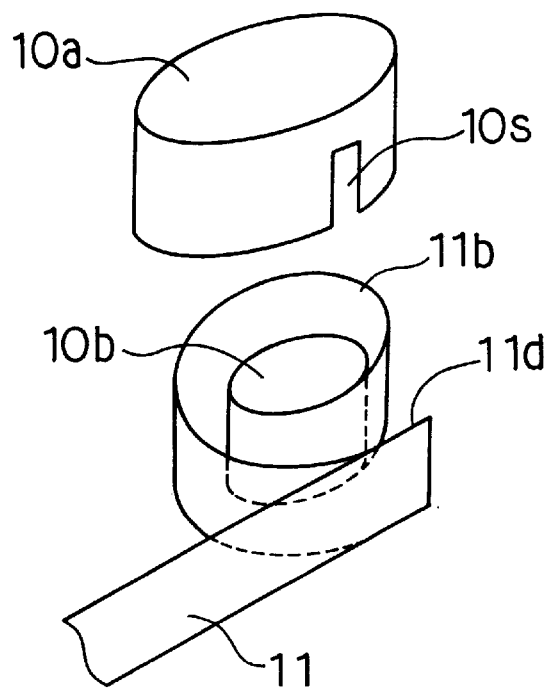
FIG. 10 is a schematic exploded view of the spool illustrated in FIG. 9.

Cable 11 and adjusting cable 11b are formed on the same cable member and divided by V-shaped bent portion 11d which is inserted in slit 10s formed in rotary drum 10a as shown in FIG. 10. Winding direction D1 from the outside of adjusting cable 11b to the inside thereof is opposite to winding direction D2 of rotary drum 10a winding up cable 11. Thus, cable 11 is secured by bent portion 11d to slit 10f without the resinous member.

Figure 11:
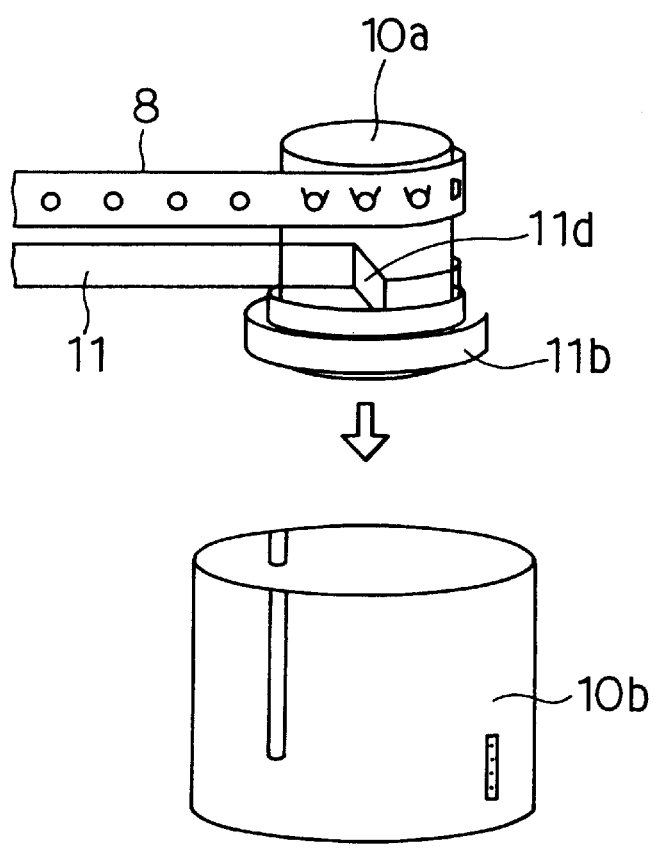
FIG. 11 is a schematic exploded view illustrating a variant of the spool of the feeder arrangement according to the third embodiment.
Figure 12A:
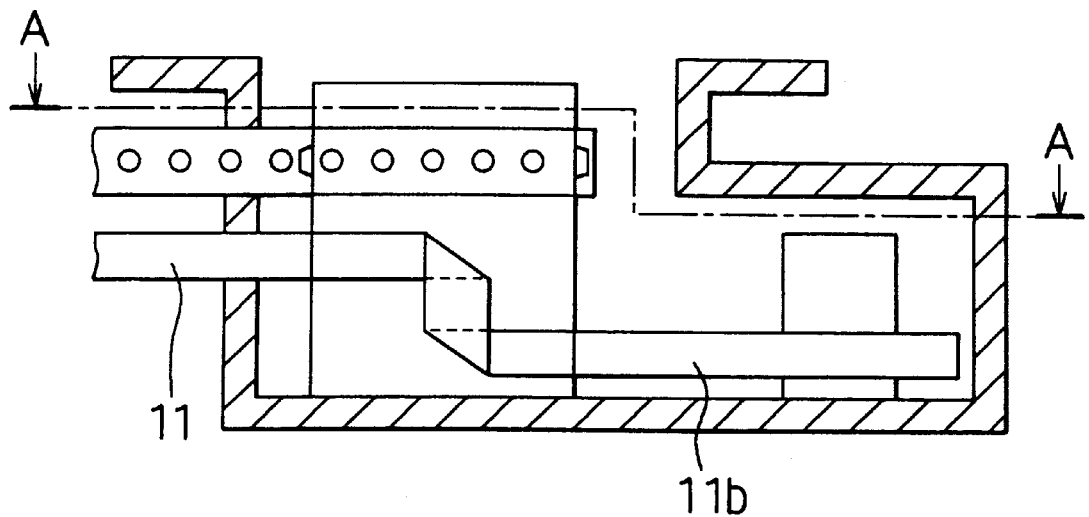
FIGS. 12A, 12B are schematic diagrams illustrating a variant of the spool of the feeder arrangement according to the third embodiment.
Figure 12B:
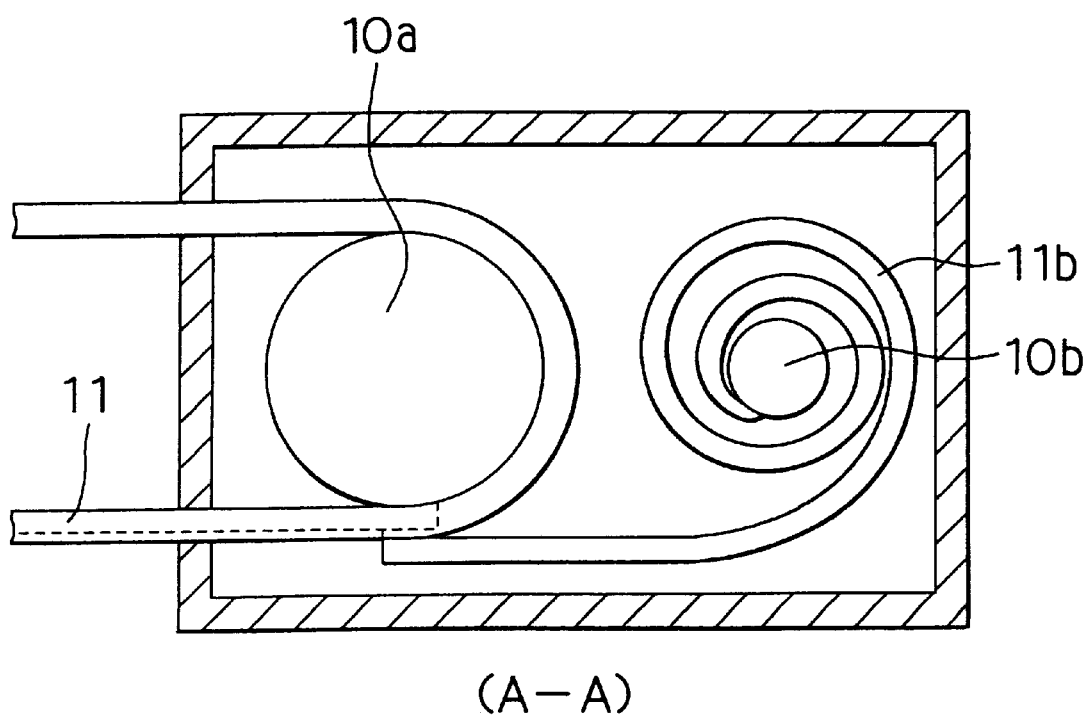

As a variant, stationary drum 10b and adjusting cable 11b can be disposed outside rotary drum 10a as shown in FIG. 11 and FIGS. 12A and 12B.

Spool 10 can be separated from actuator 9 also. In this case, spool 10 and actuator 9 are linked by gears or the like to synchronize with each other. In this case, spool 10 is mounted on sliding door 1, the end of adjusting cable 11b at the side of connector 12a is connected to on-door electric devices, and the opposite end thereof is connected to battery 12.

Figure 13:
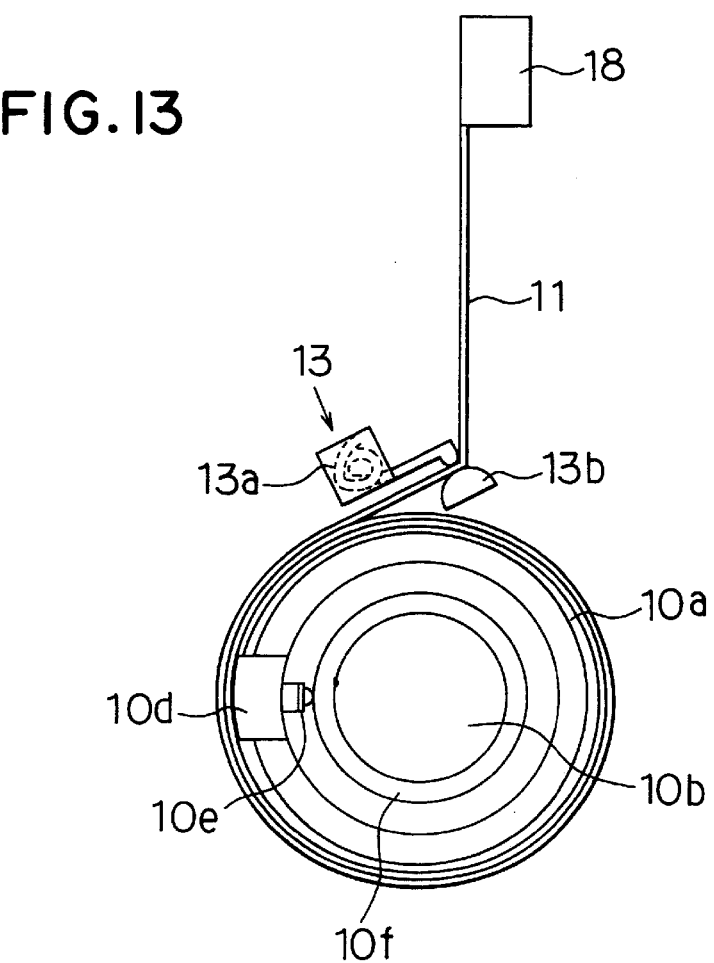
FIG. 13 is a schematic diagram illustrating a variant of the spool of the feeder arrangement according to the third embodiment.
Figure 14:
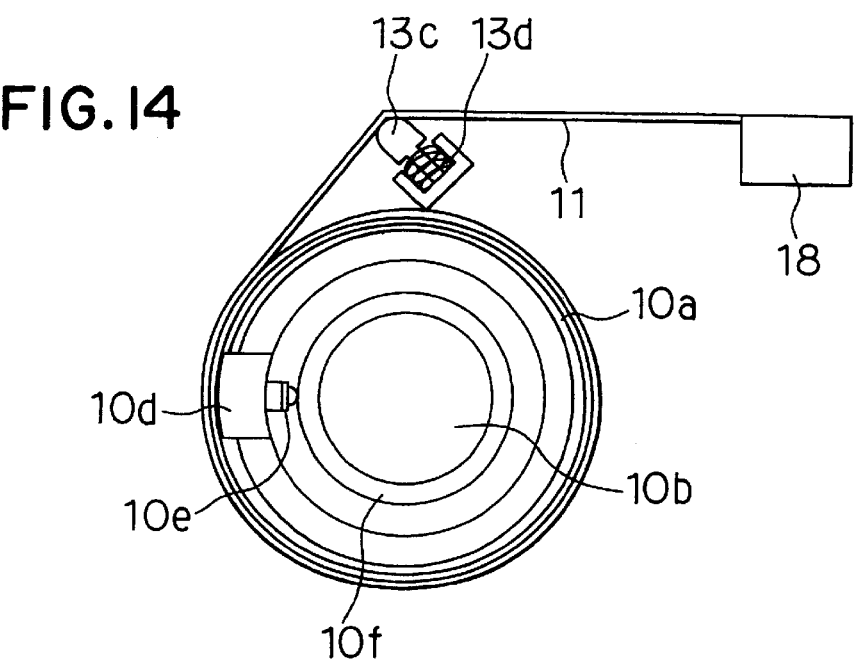
FIG. 14 is a schematic diagram illustrating a variant of the spool of the feeder arrangement according to the third embodiment.

As shown in FIG. 13, tension controller 17 is provided to apply tension to cable 11 to improve retracting motion of cable 11. Tension controller 17 is composed of torsion spring 13a and cable guide 13b. Torsion spring 13a biases cable 11 against cable guide 13b. As shown in FIG. 14, the tension controller can be composed of cable guide 13c and coil spring 13d for biasing cable guide against cable 11.

Fourth Embodiment

Figure 15:
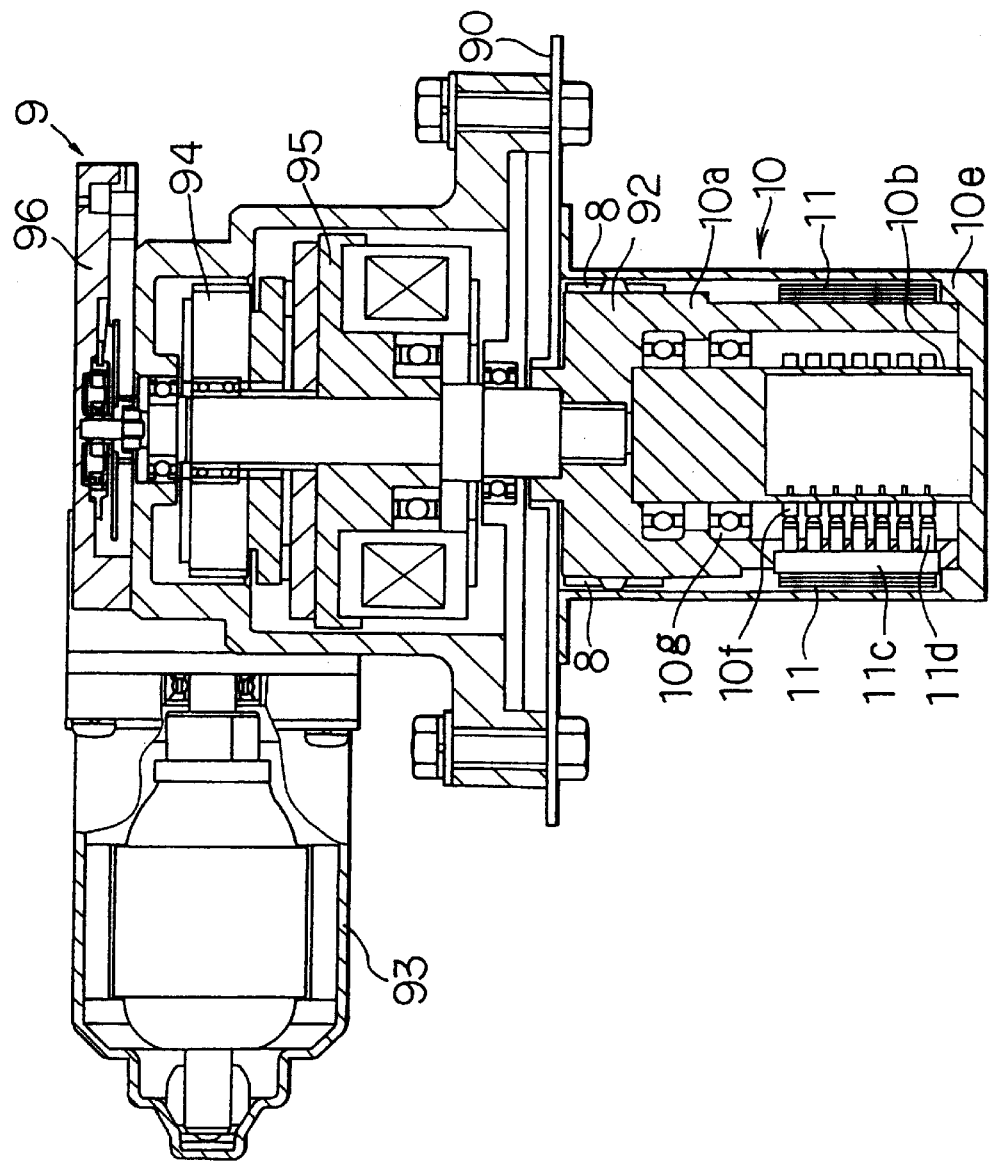
FIG. 15 is a cross-sectional side view illustrating an actuator of a feeder arrangement according to a fourth embodiment of the present invention.

A feeder arrangement according to a fourth embodiment of the present invention is described with reference to FIG. 15. This feeder arrangement has spool 10 which is different from the preceding embodiments. Spool 10 has connector 11c which has a plurality of movable contacts or brushes 11d, each of which is in contact with one of a plurality of slip rings 10f which are secured to the outer periphery of stationary drum 10b.

Each of slip rings 10f is connected to battery 12, so that electric connection can be assured of regardless of the location of sliding door 1. A pair of bearings 10g is inserted between rotary drum 10a and stationary drum to keep them to be coaxial.

Figure 16:
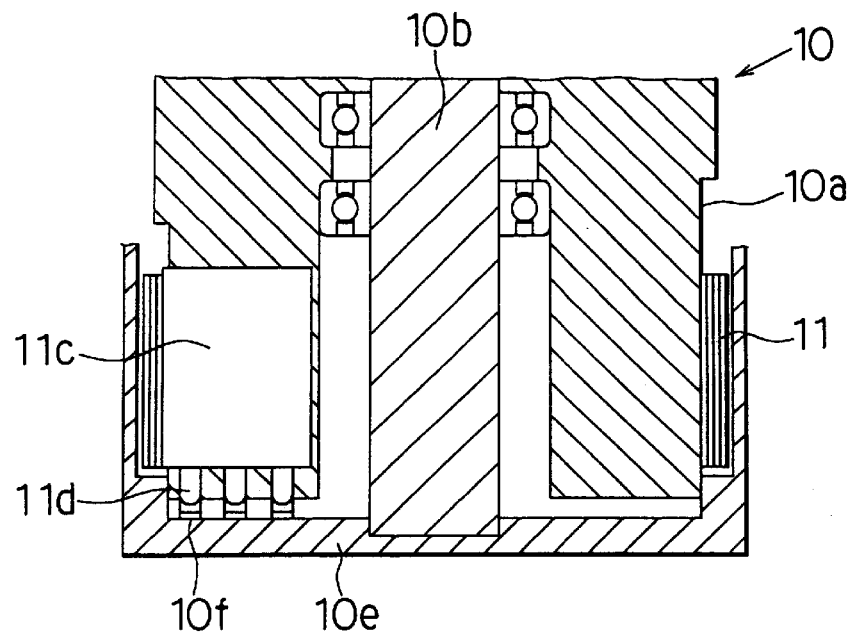
FIG. 16 is a fragmentary cross-sectional view of a variant of the actuator illustrated in FIG. 15.
Figure 17:
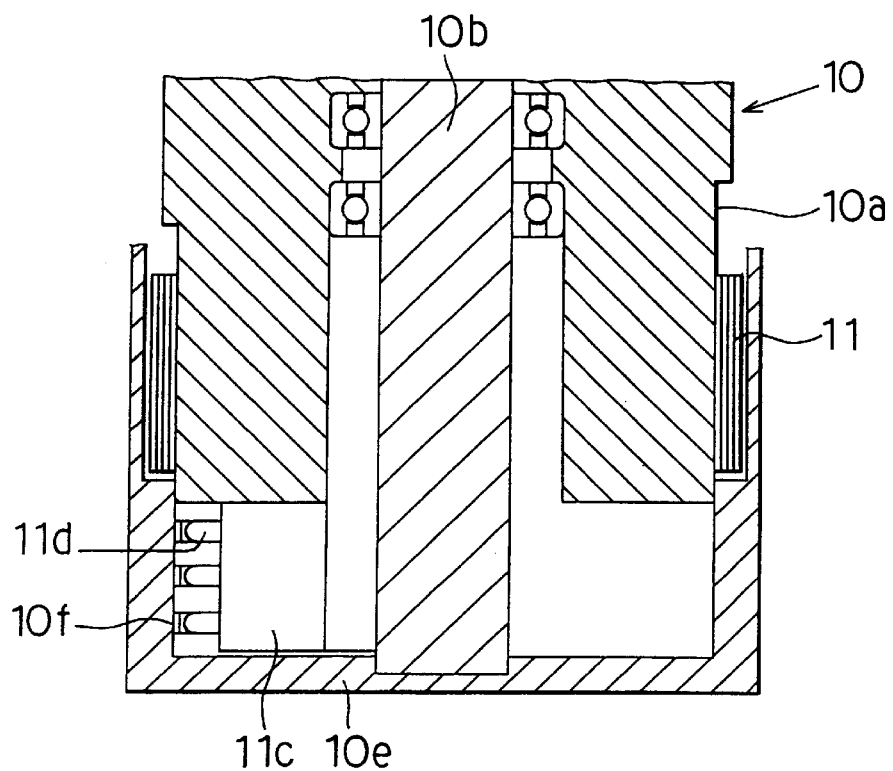
FIG. 17 is a fragmentary cross-sectional view of a variant of the actuator illustrated in FIG. 15.

As a variant, slip rings 10f can be fixed to cover 10e as shown in FIG. 16 or FIG. 17.

Fifth Embodiment

Figure 18:
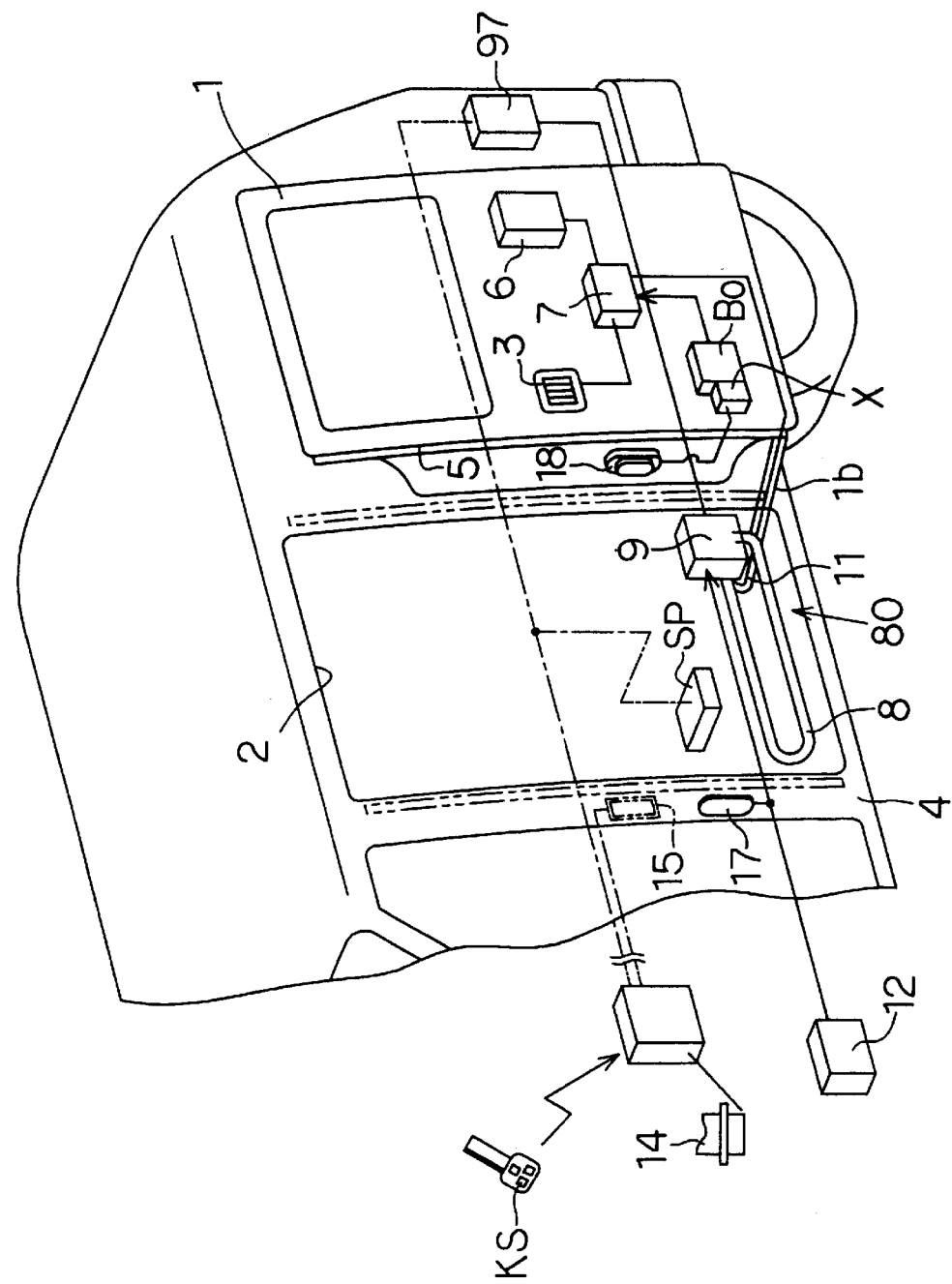
FIG. 18 is a schematic diagram illustrating as feeder arrangement according to a fifth embodiment of the present invention.
Figure 19:
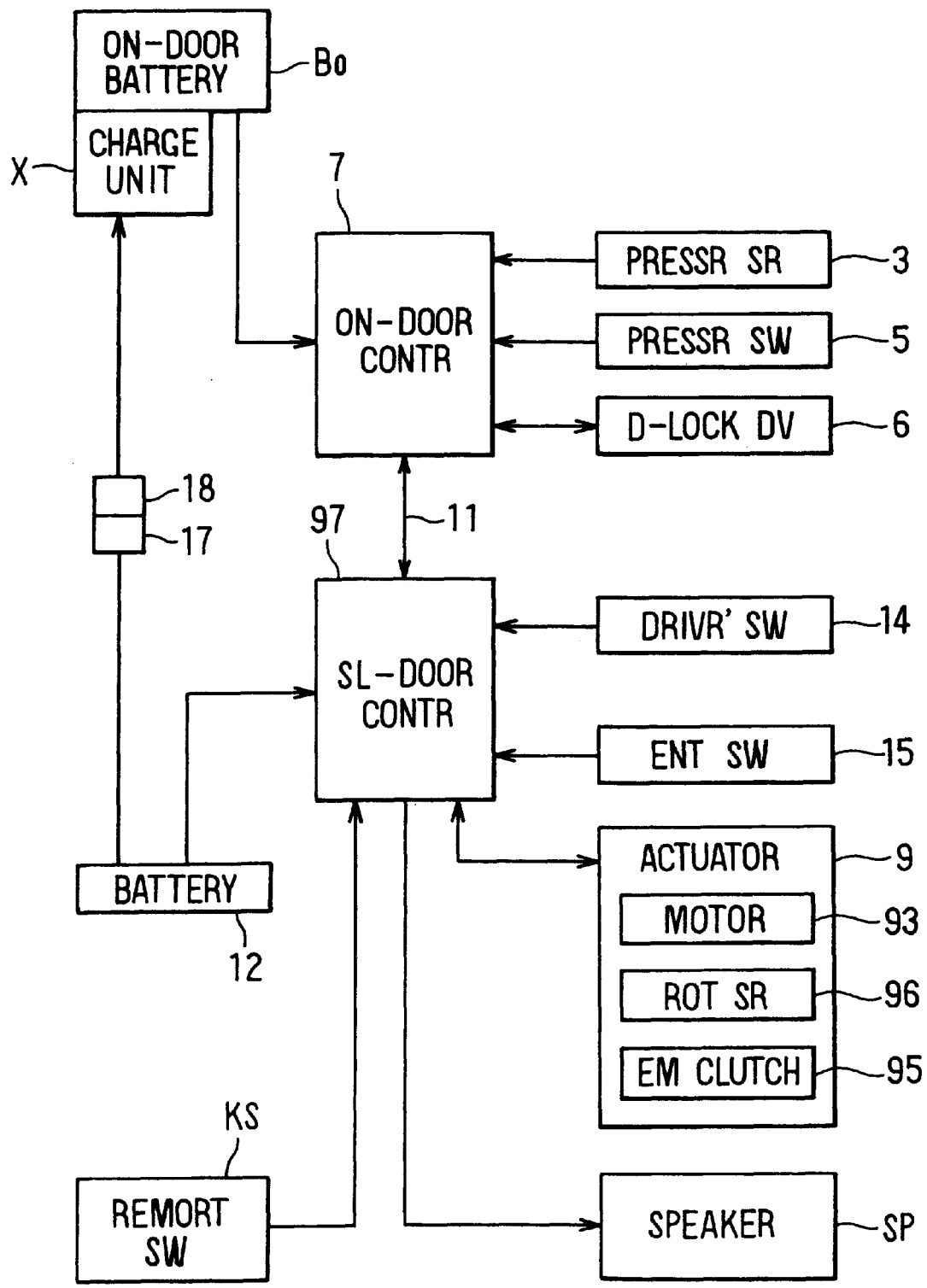
FIG. 19 is a block diagram of the control system of the feeder arrangement according to the fifth embodiment.
Figure 20:
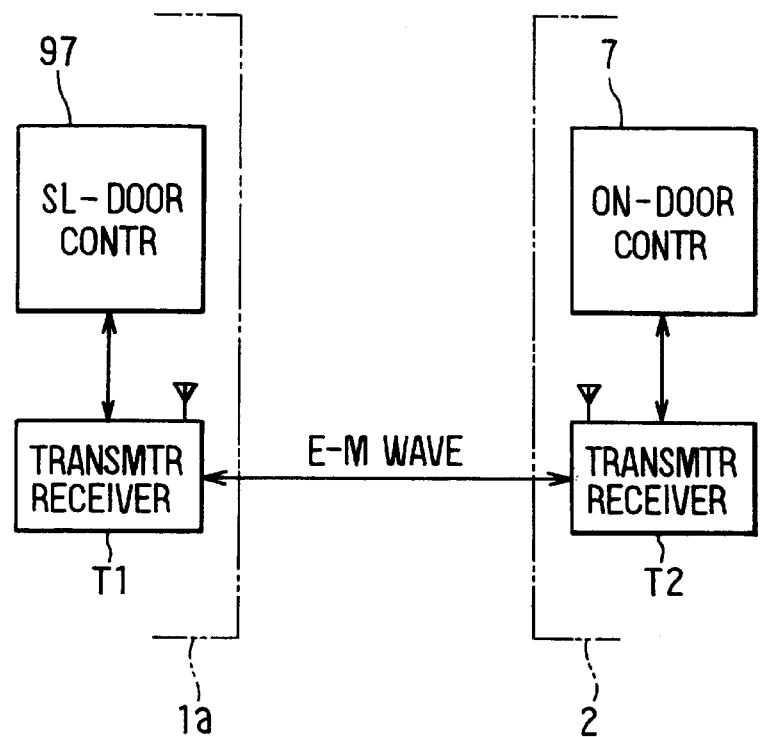
FIG. 20 is a block diagram of the signal transmitting system of a feeder arrangement according to a sixth embodiment of the present invention.

A feeder arrangement according to a fifth embodiment of the present invention is described with FIGS. 18–20 in which the same reference numerals indicate the same or substantially the same portions or elements as the feeder arrangement according to the first or second embodiment.

A plurality of signal wires are disposed on cable 11, and male connector 18, charging unit X and on-door battery Bo are mounted in sliding door 1. Male connector 18 is disposed at the front side of sliding door and connected to on-door battery Bo through charging unit X. Female connector 17 is disposed at a portion of vehicle body 4 so that connectors 17 and 18 can couple with each other while sliding door 1 is closed. Female connector 17 is connected to battery 12. On-door battery Bo is charged by battery 12 through connectors 17, 18 and charging unit X. Connectors 17, 18 are arranged so that they are not disconnected from each other even if sliding door 1 is not fully closed. Speaker Sp is disposed in the vehicle. Speaker Sp sounds when sliding door 1 is closed by actuator 9 automatically.

The operation of sliding door controller 97 is described with reference to FIG. 19 hereafter.

Sliding door controller 97 counts the number of pulse signals sent from rotation sensor 96 to detect position of sliding door 1. If a door lock signal is sent from a door lock switch (not shown), sliding door controller 97 controls door lock unit 6 to lock sliding door 1 via cable 11 and on-door controller 7. If something is caught between sliding door 1 and body 4 while sliding door 1 is being closed, pressure sensing switch 5 sends a signal to sliding door controller 97 via cable 11 and on-door controller 7 so that sliding door controller 97 reverses motor 93 in a period to open sliding door 1. If a signal is sent from pressure sensor 3 via cable 11 and on-door controller while sliding door 1 is fully closed, sliding door controller 97 controls actuator 9 to open sliding door 1. On the other hand, if the same signal is sent from pressure sensor 3 while sliding door 1 is fully opened, sliding door controller 97 controls actuator 9 to close sliding door 1. Sliding door controller 97 also controls actuator 9 to open or close sliding door 1 according to signals from driver's door switch 14, entrance switch 15 and remote control switch Ks disposed in a key.

Sliding door control switch 97 also controls speaker Sp to sound various alarms. For example: if sliding door 1 is intended to open by door handle 30, sliding door controller 97 controls speaker Sp to sound alarm A; if sliding door 1 is intended to open by remote control switch Ks, sliding door controller controls speaker Sp to sound alarm B; if sliding door 1 is intended to close by door handle 30, speaker Sp sounds alarm C; and if sliding door 1 is intended to close by remote control switch Ks, speaker Sp sounds alarm D. It is possible to control speaker Sp to sound alarm according to operation of driver's door switch 14, entrance switch 15 or an additional switch for opening sliding door 1.

Thus, on-door battery Bo is charged by main battery 12 while sliding door is fully or partly closed to supply electric power to on-door electric devices and elements such as pressure sensor 3, pressure switch 5 and door lock unit 6.

On-door battery Bo can be replaced with cable 11 for power supply as described regarding the first embodiment.

Sixth Embodiment

A feeder arrangement according to sixth embodiment of the present invention is described with reference to FIG. 20. Radio wave transmitter-receiver T1 is located on vehicle body 4 and connected to sliding door controller 97 and radio wave transmitter-receiver T2 is located on sliding door 1 and connected to on-door controller 7. Thus, cable 11 and rotary drum 10a are omitted. Radio wave transmitter receiver T1, T2 can be replaced with optical transmitter-receivers.

Variants

Figure 23:
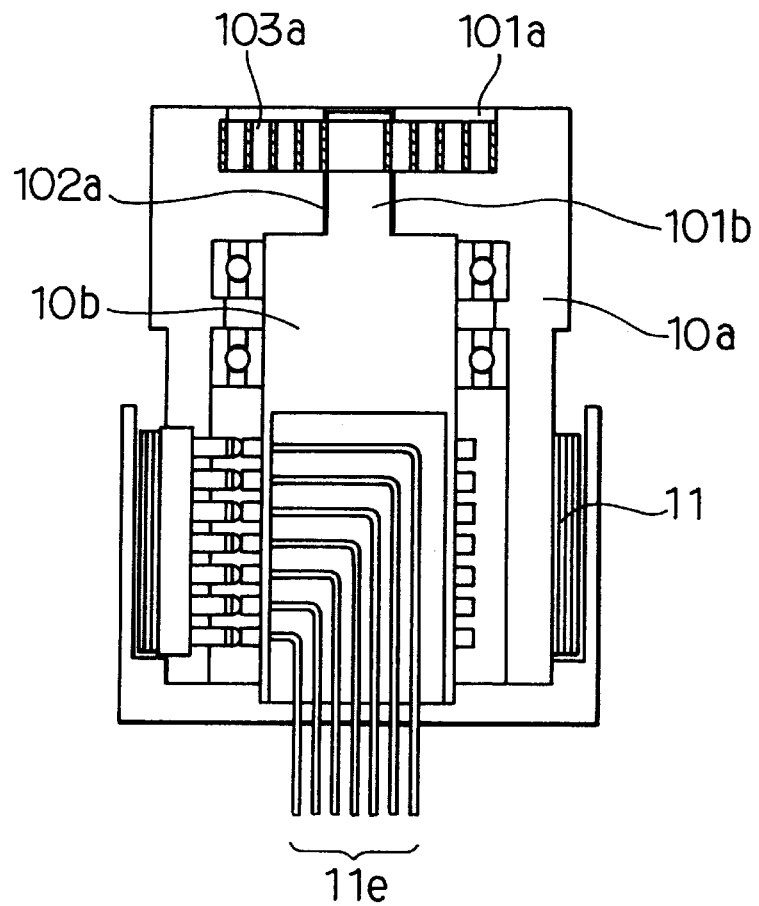
FIG. 23 is a schematic diagram illustrating a spool of a feeder arrangement according to a variant of the sixth embodiment of the present invention.
Figure 22:
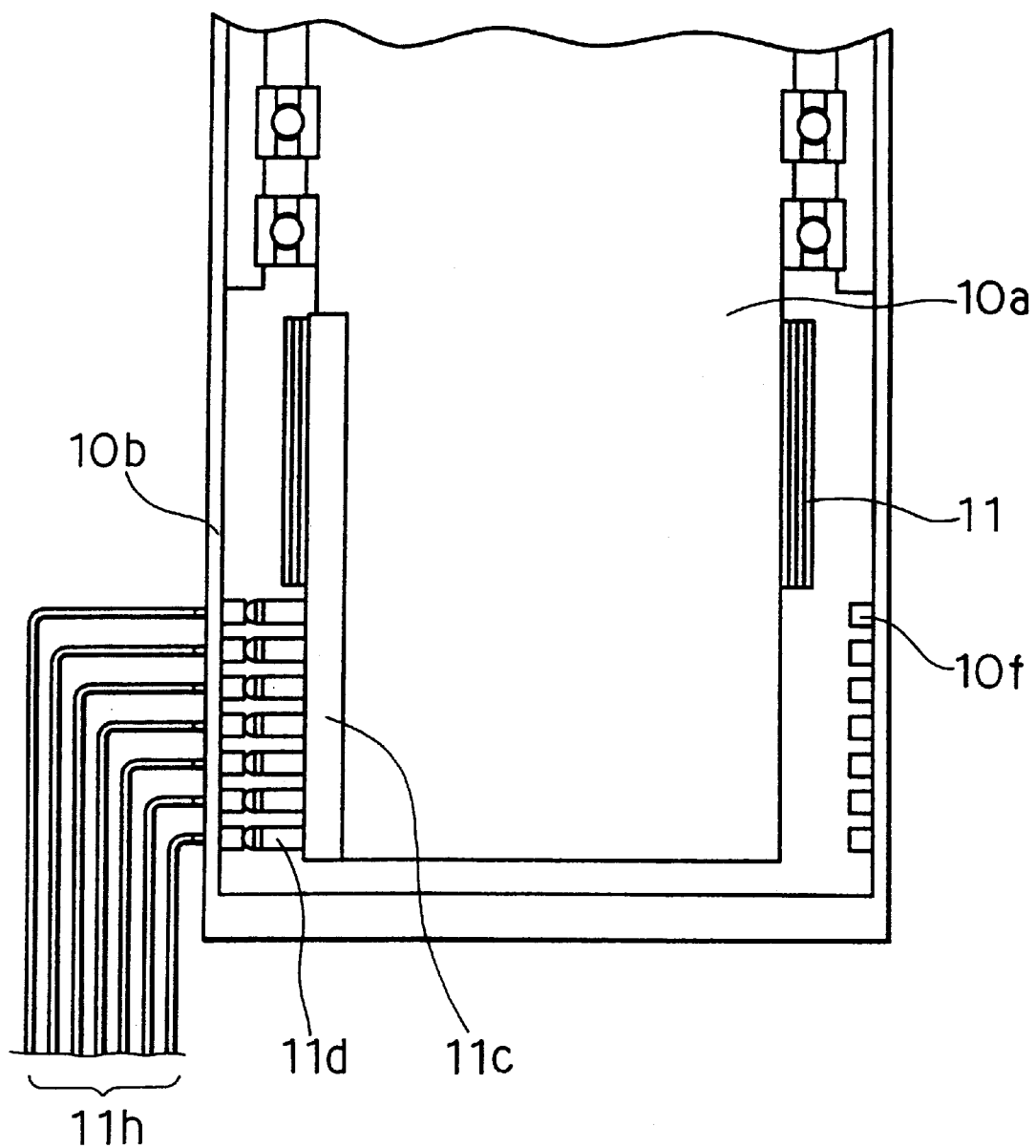
FIG. 22 is a fragmentary schematic diagram illustrating a spool of a feeder arrangement according to a variant of the sixth embodiment of the present invention.
Figure 24A:
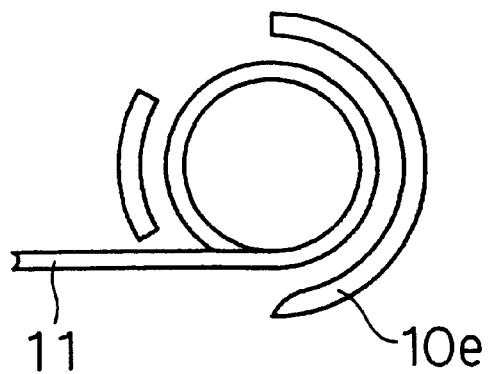
FIGS. 24A, 24B, 24C, 24D are schematic diagrams illustrating a variety of covers of spools of the feeder arrangement according to the sixth embodiment.
Figure 24B:
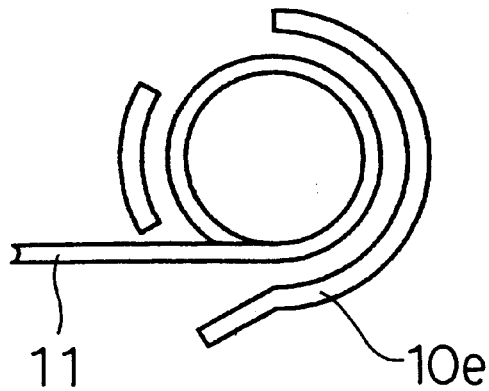
Figure 24C:
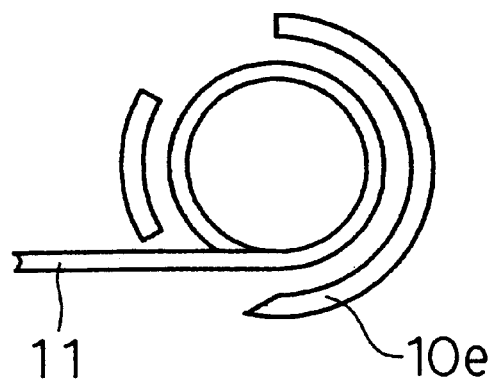
Figure 24D:
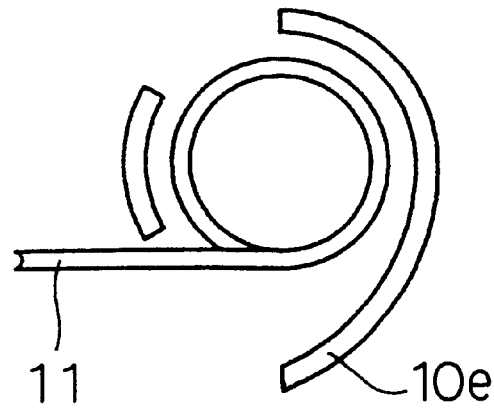

Protecting cover 10e can be provided with curled guide portion for smooth guiding of cable 11 as illustrated in FIG. 21. Rotary drum 10a can be disposed at the center and stationary drum 10b can be disposed around rotary drum 10a as shown in FIG. 22. Reference numeral 11h in FIG. 22 indicates lead wires. As shown in FIG. 23, rotary drum 10a is provided with concave 101a having center hole 102a. Coil spring 103a is held in concave 101a with one end of coil spring 103a being fixed to concave 101a. Stationary drum 10b is provided with shaft 101b fitted into center hole 102a, and the other end of coil spring 103a is fixed to shaft 101b. Cable 11 is biased by coil spring 103a. Rotary drum 10a is rotated by actuator 9 in the same manner as other embodiments. Accordingly, spool 10 can be separated from actuator 9. Spool 10 can be located where pulley 91 is located shown in FIG. 2 if pulley 91 is located where spool 10 is located shown in FIG. 2. When sliding door 1 is fully closed, cable 11 is stored inside cover 10e so that cable 11 can be prevented from contacting guides 11a. FIG. 24A–24D illustrates variants of cover 10e in this case.

FIGS. 25A, 25B, 26A and 26B illustrate a variant of door handle 30 for sliding door 1. Door handle 30 is composed of front handle lever 31 pivoted on pin 31b, rear handle lever 32 pivoted on pin 32b, handle housing 33, front microswitch 3a and rear microswitch 3b. Handle levers 31, 32 have cam portions 31e, 32e at one ends thereof and stopper portions 31f, 32f at the middle thereof respectively. Front microswitches 3a has lever 31d in engagement with cam portion 31e of front handle lever 31, and rear microswitch 3b has lever 32d in engagement with cam portion 32e of rear handle lever 32. Front handle lever 31 is biased by a torsion spring (not shown) against manually opening force exerted on front handle lever 31, and rear handle lever 32 is also biased by a torsion spring (not shown) against manually closing force exerted on rear handle lever 32.

Figure 25A:
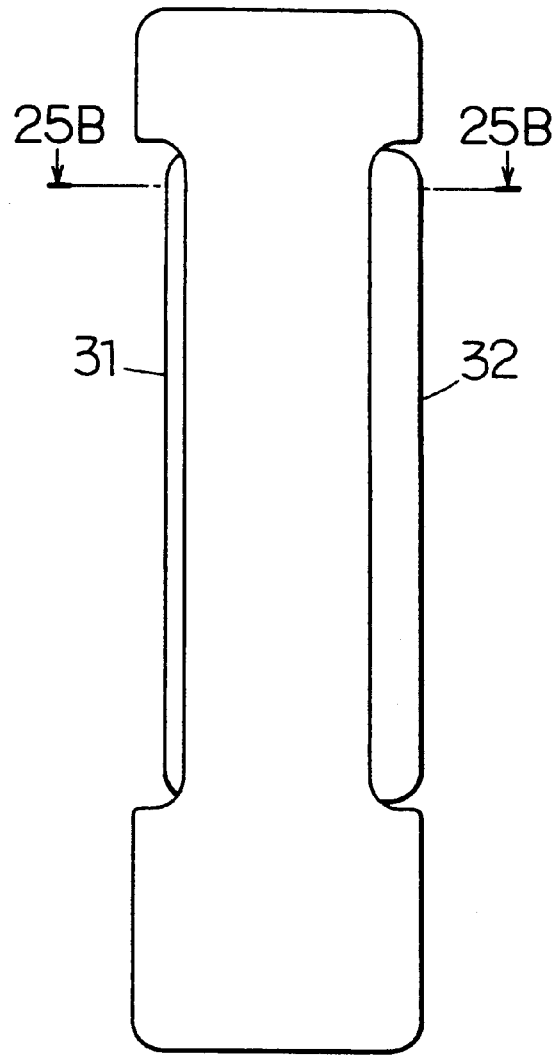
FIGS. 25A, 25B are schematic diagram showing operation of a door handle of a sliding door for use with the feeder arrangement according to the present invention.
Figure 25B:
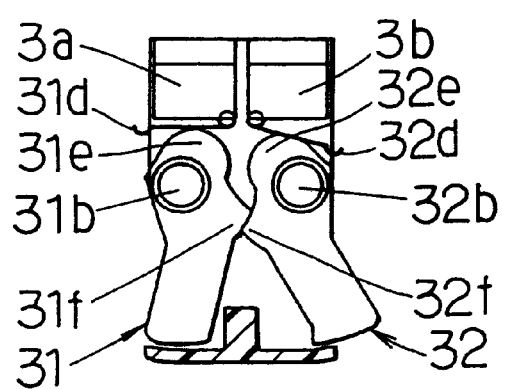

When front handle lever 31 is operated to open sliding load door as shown in FIGS. 25A and 25B, it rotates counterclockwise toward rear handle lever 32 and front microswitch 3a is turned on to send the door-open signal to sliding door controller 97 to control actuator 9 via on-door controller 7 to open sliding door 1. Stopper portion 31f of front handle lever 31 is stopped by stopper portion 32f of rear handle lever 32 thereafter to restrict rear microswitch 3b from turning on.

Figure 26A:
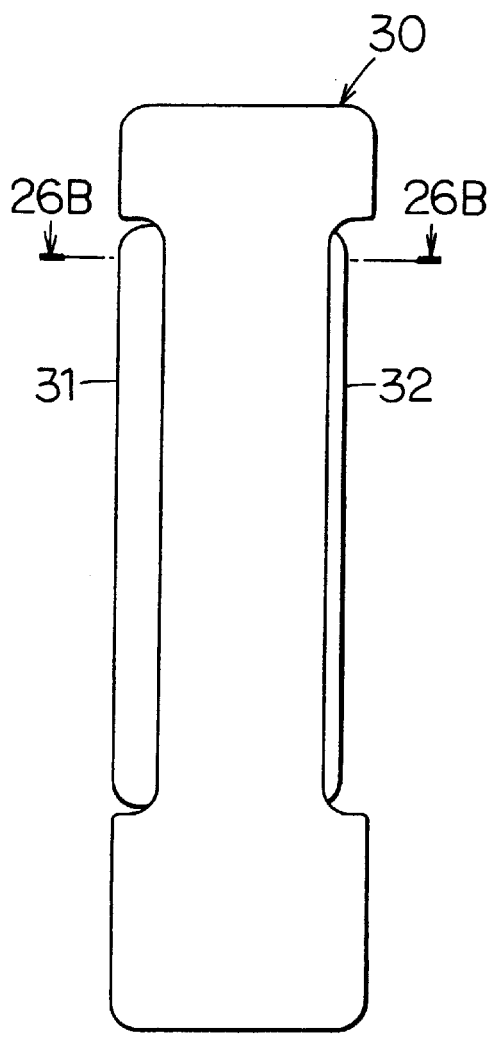
FIGS. 26A, 26B are schematic diagram showing operation of the same door handle of a sliding door.
Figure 26B:
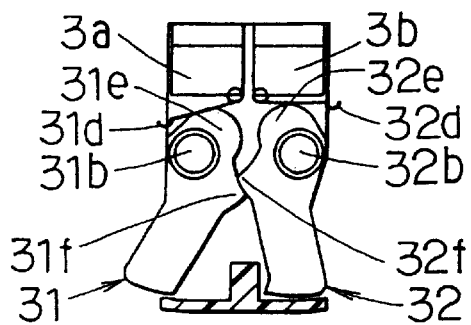

When rear handle lever 32 is operated to close sliding door as shown in FIGS. 26A and 26B, it rotates clockwise toward front handle lever 31 and rear microswitch 3b is turned on to send the door-close signal to sliding door controller 97 to control actuator 9 via on-door controller 7 to close sliding door 1. Stopper portion 32f of rear handle lever 32 is stopped by stopper portion 31f of front handle lever 31 thereafter to restrict front microswitch 3a from turning on.

Since front handle lever 31 is disposed where the manually opening force is applied and rear handle lever 32 is disposed where manually closing force is applied, sliding door 1 can be opened in the same manner as a sliding door without actuator 9. This prevents unintentional operation of sliding door causing injury, such as operating closing-handle-lever with intention to open the sliding door. As described above, stopper portions 31f, 32f assure that only one signal is sent to sliding door controller 97, thereby preventing erroneous operation of actuator 9.

Microswitches 31a, 32a can be replaced with potentiometer respectively. In this case, motor 93 and electromagnetic clutch 95 are operated until one of the potentiometers provide a preset value.

Figure 27:
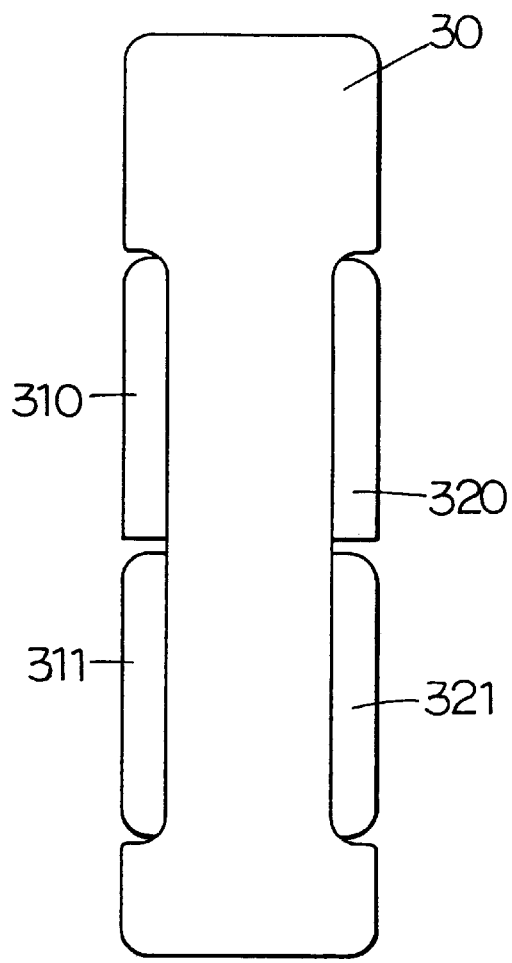
FIG. 27 is a schematic diagram of a variant of the door handle shown in FIGS. 25A–26B.

FIG. 27 illustrates another variant of door handle 30.

Door handle 30 is composed of first handle levers 310, 320 for operating the microswitches and second handle levers 311, 321 for operating the potentiometers. When manual operation force is once applied to one of first handle levers 310, 320, sliding door 1 is fully opened or closed. On the other hand, when manual operation force is applied to one of second handle levers 311, 321, sliding door 1 can be opened or closed until the potentiometer provides a preset value.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A feeder arrangement supplying power from a battery to an on-door electric device disposed in a sliding door comprising:
   a flexible cable, adapted to electrically connect between the battery and the on-door electric device, and adapted to supply electric power to the on-door electric device; and
   a spool unit, having an attachment mechanism that is adapted to attach to said vehicle body, winding and unwinding said flexible cable in synchronism with motion of said sliding door;
   wherein said spool unit comprises a rotary drum rotatable to wind and unwind said flexible cable in synchronism with motion of said sliding door, stationary drum and retractable adjusting cable disposed between said rotary drum and said stationary drum for electrically connecting said battery and said flexible cable.

2. A feeder arrangement as claimed in claim 1, wherein said rotary drum is disposed around stationary drum.

3. A feeder arrangement as claimed in claim 1, wherein said adjusting cable is integrated with said flexible cable, and said rotary drum has a slit, and wherein said adjusting cable and said flexible cable is divided by said slit.

4. A feeder arrangement as claimed in claim 3, wherein said adjusting cable and said flexible cable are further divided by a bent disposed at said slit.

5. A feeder arrangement as claimed in claim 4, wherein said rotary drum comprises a cylindrical member having an open end.

6. A feeder arrangement as claimed in claim 1, wherein said sliding door is disposed on a vehicle.

7. A feeder arrangement supplying power from a battery to an on-door electric device disposed in a sliding door comprising:
   a flexible cable, electrically connected to said battery and said on-door electric device, for supplying electric power to said on-door electric device; and
   a spool unit including a rotary drum rotatable to wind or unwind said flexible cable in synchronism with motion of said sliding door, stationary drum and a movable contact member secured to said rotary drum to be electrically connected to said flexible cable and a slip ring secured to said stationary drum in contact with said movable contact.

8. A feeder arrangement as claimed in claim 7, wherein said rotary drum is disposed around said stationary drum, and said spool further comprises a cover disposed around said rotary drum for guiding said flexible cable.

9. A feeder arrangement as claimed in claim 8, wherein said spool unit further comprises a movable contact member secured to said rotary dram to be electrically connected to said flexible cable and a slip ring secured to said stationary drum in contact with said movable contact member.

10. A feeder arrangement as claimed in claim 7, wherein said slip ring is connected to said battery to supply electric power to said flexible cable.

11. A feeder arrangement as claimed in claim 7, said sliding door is disposed on a vehicle.

12. A feeder arrangement supplying power from a battery to an on-door electric device disposed in a sliding door comprising:
   a flexible cable, adapted to electrically connect between the battery and the on-door electric device, and adapted to supply electric power to the on-door electric device; and
   a spool unit, having an attachment mechanism that is adapted to attach to said vehicle body, winding and unwinding said flexible cable in synchronism with motion of said sliding door;
   a door stay secured to said sliding door and extending therefrom, said door stay being connected to said on-door electric device;
   a movable connecting member fixed to said stay for electrically connecting said flexible cable and said stay.

13. A feeder arrangement as claimed in claim 12 further comprising a motor for driving said movable connecting member and said spool unit in synchronism with motion of said sliding door.

14. A feeder arrangement as claimed in claim 12, wherein said flexible cable comprises a flat cable.

15. A feeder arrangement as claimed in claim 12, said sliding door is disposed on a vehicle.

16. A feeder arrangement supplying power to an on-door electric device disposed in a sliding door comprising:
   a rechargeable on-door battery adapted to be disposed in said sliding door;
   an on-door battery-charging unit adapted to be disposed in said sliding door and connected to said on-door battery;
   a connecting unit adapted to be disposed between said sliding door and a portion of said vehicle body outside said sliding door for connecting said main battery and said on-door battery-charging unit when said sliding door is closed;
   an actuator for driving said sliding door; and
   means, disposed in said sliding door, for providing said actuator with a signal controlling said actuator;
   wherein said means comprises a flexible cable for transmitting said signals and a spool unit for winding and unwinding said flexible cable in synchronism with motion of said sliding door.

17. A feeder arrangement supplying power from a battery to an on-door electric device disposed in a sliding door comprising:
   first means for driving said sliding door;
   second means, disposed in said sliding door, for providing a signal controlling said actuator;
   a flexible cable electrically connected to said battery and said on-door electrical device;
   a spool unit for winding and unwinding said flexible cable in synchronism with motion of said sliding door; and
   third means for transmitting said signal to said actuator.

18. A feeder arrangement as claimed in claim 17, wherein said third means comprises a signal transmitting cable disposed in said spool unit.

19. A feeder arrangement as claimed in claim 18, wherein said flexible cable and signal transmitting cable are integrated and wound and unwound by said spool unit in synchronism with motion of said sliding door.

20. A feeder arrangement as claimed in claim 17, wherein said third means comprises:
- a stationary electromagnetic wave transmitter-receiver connected to said first means and disposed outside said sliding door; and
- an on-door electromagnetic wave transmitter-receiver disposed in said sliding door and connected to said second means.

21. A feeder arrangement supplying power from a battery to an on-door electric device disposed in a sliding door comprising:
- a flexible cable, adapted to electrically connect between the battery and the on-door electric device, and adapted to supply electric power to the on-door electric device;
- a spool unit, having an attachment mechanism that is adapted to attach to said vehicle body, winding and unwinding said flexible cable in synchronism with motion of said sliding door;
- an actuator for driving said sliding door;
- a plurality of switches for providing signals for controlling said actuator; and
- an alarm unit for providing a plurality of different sounds according to operation of said switches.

22. A feeder arrangement as claimed in claim 21, wherein said sliding door has a door handle and a door-opening switch and a door-closing switch, and said door-opening switch is disposed on a side of said door handle where manual door-opening force is applied and said door-closing switch is disposed on a side of said door handle where manual door-closing force is applied.

23. A feeder arrangement as claimed in claim 22, wherein said door handle comprises a door-opening handle member linked with said door-opening switch and a door-closing handle member linked with said door-closing switch.

* * * * *

UNITED STATES PATENT AND TRADEMARK OFFICE
CERTIFICATE OF CORRECTION

PATENT NO.     : 6,108,976
DATED          : AUGUST 29, 2000
INVENTOR(S)    : YUKIYASU KATO, KIYOSHI TAMADA AND KIROYUKI HARADA

It is certified that error appears in the above-identified patent and that said Letters Patent is hereby corrected as shown below:

On the front page, [75] please correct the spelling of Yukiyasu Kato's residence from --[Iwato-gun] to Iwata-gun.--

On the front page, [73] please correct the spelling of the Assignee from --[Amso. Co. Ltd.] to Asmo. Co. Ltd.--

Signed and Sealed this

First Day of May, 2001

Attest:

NICHOLAS P. GODICI

*Attesting Officer*     *Acting Director of the United States Patent and Trademark Office*